(12) United States Patent
Kojchev et al.

(10) Patent No.: US 12,371,061 B2
(45) Date of Patent: Jul. 29, 2025

(54) METHOD AND DEVICE FOR COORDINATING VEHICLE ROUTES IN CONFINED AREAS

(71) Applicant: Volvo Autonomous Solutions AB, Gothenburg (SE)

(72) Inventors: Stefan Kojchev, Mölndal (SE); Robert Hult, Torslanda (SE); Oskar Wigström, Gothenburg (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 337 days.

(21) Appl. No.: 18/048,665

(22) Filed: Oct. 21, 2022

(65) Prior Publication Data

US 2023/0134026 A1   May 4, 2023

(30) Foreign Application Priority Data

Oct. 29, 2021 (EP) .................................... 21205593
Mar. 30, 2022 (EP) .................................... 22165524

(51) Int. Cl.
*B60W 60/00* (2020.01)
(52) U.S. Cl.
CPC ..... *B60W 60/0015* (2020.02); *B60W 2556/45* (2020.02)
(58) Field of Classification Search
CPC .......... B60W 60/0015; B60W 2556/45; G08G 1/207; G06Q 10/047
See application file for complete search history.

(56) References Cited

U.S. PATENT DOCUMENTS

| | | | |
|---|---|---|---|
| 11,650,590 B2 * | 5/2023 | Di Cairano | G01C 21/3658 701/414 |
| 2013/0018572 A1 | 1/2013 | Jang | |

(Continued)

FOREIGN PATENT DOCUMENTS

| | | |
|---|---|---|
| CN | 106251016 A | 12/2016 |
| WO | 2021065196 A1 | 4/2021 |

OTHER PUBLICATIONS

L. Chen and C. Englund, "Cooperative Intersection Management: A Survey," in IEEE Transactions on Intelligent Transportation Systems, vol. 17, No. 2, pp. 570-586, Feb. 2016.

(Continued)

*Primary Examiner* — Peter D Nolan
*Assistant Examiner* — Anwar Mohamed
(74) *Attorney, Agent, or Firm* — Venable LLP; Jeffri A. Kaminski

(57) ABSTRACT

Confined areas present an opportunity for early deployment of autonomous vehicles due to the absence of non-controlled traffic participants. In this disclosure, two approaches for coordination of multiple AVs in confined sites. Each approach computes speed-profiles for the AVs such that collisions are avoided in cross intersections, merge-split zones and narrow road sections. Specifically, this is done by solving an optimal control problem where the motion of all vehicles is optimized jointly. The order in which the vehicles pass the crossings is determined through the solution of a Mixed Integer Quadratic Program. Through simulation results, the capability of the algorithm is demonstrated in terms of performance and observance of collision avoidance constraints.

21 Claims, 16 Drawing Sheets

(56) References Cited

U.S. PATENT DOCUMENTS

| | | | | |
|---|---|---|---|---|
| 2018/0299882 A1* | 10/2018 | Kichkaylo | ....... | G05B 19/41895 |
| 2021/0302974 A1* | 9/2021 | Di Cairano | .............. | G06N 5/01 |

OTHER PUBLICATIONS

S. Riazi, K. Bengtsson and B. Lennartson, "Energy Optimization of Large-Scale AGV Systems," in IEEE Transactions on Automation Science and Engineering, vol. 18, No. 2, pp. 638-649, Apr. 2021.

O. Wigstrom, B. Lennartson, A. Vergnano and C. Breitholtz, "High-Level Scheduling of Energy Optimal Trajectories," in IEEE Transactions on Automation Science and Engineering, vol. 10, No. 1, pp. 57-64, Jan. 2013.

Hult, Robert. Optimization-based coordination strategies for connected and autonomous vehicles. Chalmers Tekniska Hogskola (Sweden), 2019.

Bagloee, Saeed Asadi, et al. "Autonomous vehicles: challenges, opportunities, and future implications for transportation policies." Journal of modern transportation 24.4 (2016): 284-303.

Khayatian, Mohammad, et al. "A survey on intersection management of connected autonomous vehicles." ACM Transactions on Cyber-Physical Systems 4.4 (2020): 1-27.

Hafner, Michael R., et al. "Cooperative collision avoidance at intersections: Algorithms and experiments." IEEE Transactions on Intelligent Transportation Systems 14.3 (2013): 1162-1175.

Kuyer, Lior, et al. "Multiagent reinforcement learning for urban traffic control using coordination graphs." Joint European Conference on Machine Learning and Knowledge Discovery in Databases. Springer, Berlin, Heidelberg, 2008.

Colombo, Alessandro, and Domitilla Del Vecchio. "Least restrictive supervisors for intersection collision avoidance: A scheduling approach." IEEE Transactions on Automatic Control 60.6 (2014): 1515-1527.

Hult, Robert, et al. "Optimal coordination of automated vehicles at intersections: Theory and experiments." IEEE Transactions on Control Systems Technology 27.6 (2018): 2510-2525.

Katriniok, Alexander, Peter Kleibaum, and Martina Joševski. "Distributed model predictive control for intersection automation using a parallelized optimization approach." IFAC—PapersOnLine 50.1 (2017): 5940-5946.

Hult, Robert, et al. "Optimal coordination of automated vehicles at intersections with turns." 2019 18th European Control Conference (ECC). IEEE, 2019.

Hult, Robert, et al. "An miqp-based heuristic for optimal coordination of vehicles at intersections." 2018 IEEE Conference on Decision and Control (CDC). IEEE, 2018.

Letter, Clark, and Lily Elefteriadou. "Efficient control of fully automated connected vehicles at freeway merge segments." Transportation Research Part C: Emerging Technologies 80 (2017): 190-205.

Omidvar, Aschkan, et al. "Optimizing freeway merge operations under conventional and automated vehicle traffic." Journal of Transportation Engineering, Part A: Systems 146.7 (2020): 04020059.

Bui, Khac-Hoai Nam, and Jason J. Jung. "Cooperative game-theoretic approach to traffic flow optimization for multiple intersections." Computers & Electrical Engineering 71 (2018): 1012-1024.

Richards, Arthur, and Jonathan How. "Mixed-integer programming for control." Proceedings of the 2005, American Control Conference, 2005 . . . IEEE, 2005.

Colombo, Alessandro, and Domitilla Del Vecchio. "Efficient algorithms for collision avoidance at intersections." Proceedings of the 15th ACM international conference on Hybrid Systems: Computation and Control. 2012.

Kobetski, Avenir, Domenico Spensieri, and Martin Fabian. "Scheduling algorithms for optimal robot cell coordination—a comparison." 2006 IEEE International Conference on Automation Science and Engineering. IEEE, 2006.

Błażewicz, Jacek, Wolfgang Domschke, and Erwin Pesch. "The job shop scheduling problem: Conventional and new solution techniques." European journal of operational research 93.1 (1996): 1-33.

Andersson, Joel AE, et al. "CasADi: a software framework for nonlinear optimization and optimal control." Mathematical Programming Computation 11.1 (2019): 1-36.

Wächter, Andreas, and Lorenz T. Biegler. "On the implementation of an interior-point filter line-search algorithm for large-scale nonlinear programming." Mathematical programming 106.1 (2006): 25-57.

International Search Report and Written Opinion in corresponding International Application No. PCT/EP2021/084232 mailed Jul. 1, 2022 (14 pages).

Robert Hult et al.; "An MIQP-based heuristic for Optimal Coordination of Vehicles at Intersections"; In 57th IEEE Conference on Decision and Control, CDC 2018, Miami, FL, USA, Dec. 17-19, 2018. pp. 2783-2790, IEEE, 2018.; DOI: 10.1109/CDC.2018.8618945; 8 pages.

Robert Hult et al.; "Optimal Coordination of Automated Vehicles at Intersections: Theory and Experiments"; IEEE Transactions on Control Systems Technology; vol. 27, Issue: 6, Nov. 2019; DOI: 10.1109/TCST.2018.2871397; pp. 2510-2525; 16 pages.

Zhou Donghao et al: "Autonomous Vehicles' Turning Motion Planning for Conflict Areas at Mixed-Flow Intersections", IEEE Transactions on Intelligent Vehicles, IEEE, vol. 5, No. 2, Nov. 25, 2019 (Nov. 25, 2019), pp. 204-216, XP011790614, ISSN: 2379-8858, DOI: 10.1109/TIV.2019.2955854 [retrieved on May 22, 2020].

European Search Report dated May 19, 2023 in corresponding European Patent Application No. 22195954.7, 16 pages.

* cited by examiner

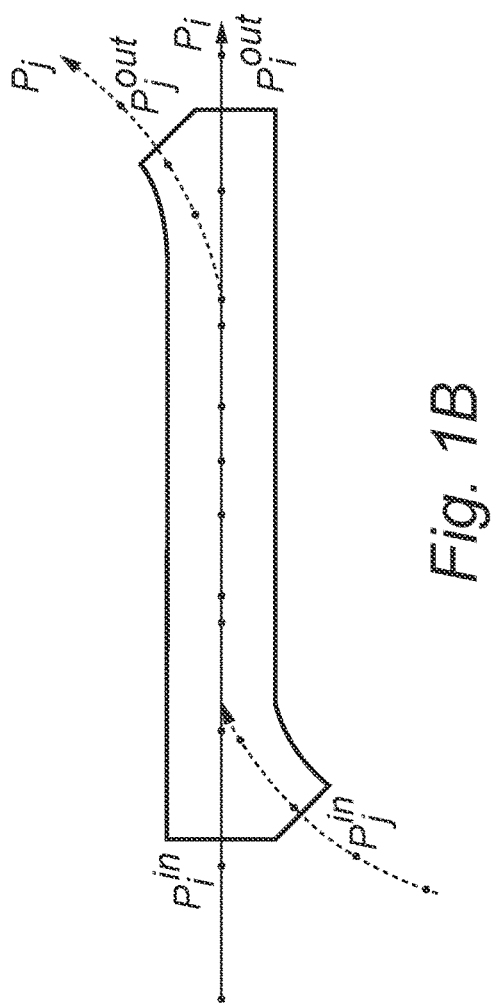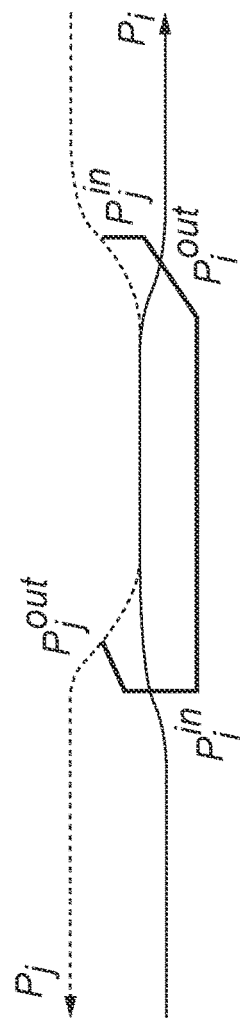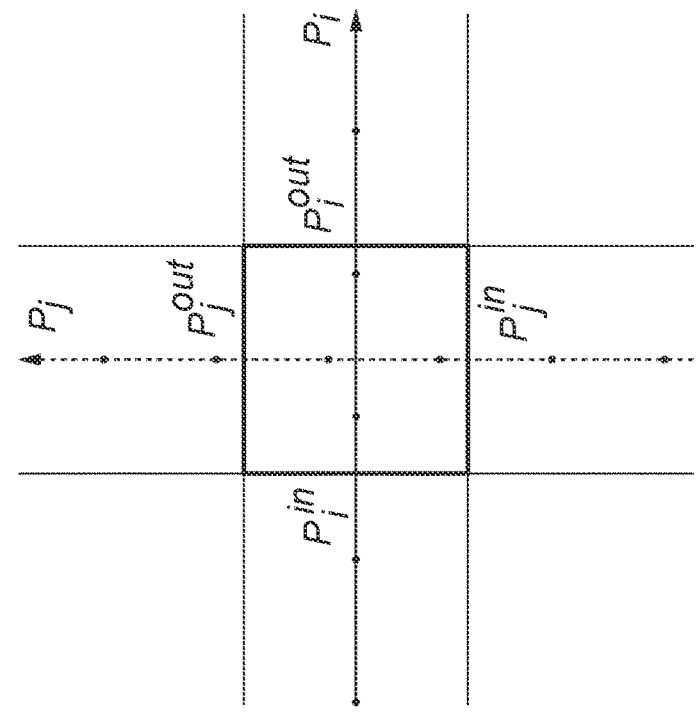
Fig. 1A
Fig. 1B
Fig. 1C

METHOD AND DEVICE FOR COORDINATING VEHICLE ROUTES IN CONFINED AREAS

TECHNICAL FIELD

The present disclosure relates to the field of automatic vehicle control. In particular, it proposes techniques for coordinating the movement of multiple vehicles in an environment with conflict zones.

BACKGROUND

It is believed that fully automated vehicles (AV) have the potential to drastically change the transport industry, both in terms of increased safety and efficiency [1]. The most drastic improvements are expected when a substantial part of the vehicles on public roads are fully automated, as in e.g., "robo-taxis" and hub-to-hub transports on highways. Unfortunately, managing the unpredictable conditions on public roads in a reliably safe manner has proven to be harder than initially expected, and the current state-of-the-art exhibits a lack of production-level maturity.

However, confined areas, such as mines, ports and logistic centers, lack many of the difficult aspects of public road driving, and present use cases for near-future, large-scale deployment of automated vehicles. Within this context, the AVs form a component in transport solutions for commercial operations, where the material-flow is largely handled without human involvement.

One of the challenges in such systems is the efficient coordination of multiple AVs use of mutually exclusive resources, such as intersections, narrow roads, work-stations (e.g. crushers, loading/unloading spots etc.) and, in the case of electrified AVs, charging-stations. Poor coordination can lead to substantial decreases in energy-efficiency and productivity, reducing the benefits of automation. In detail, failure to coordinate the traffic situation efficiently has the following implications:

Energy waste: With poor planning, the vehicles expend more energy than required to perform the transport missions. An efficient planner, on the other hand, prevents vehicles from coming to unnecessary stops at, e.g., intersections, by pre-emptive speed adjustments. Moreover, an efficient planner harvests potential energy better by, e.g., prioritizing vehicles going downhill in the MUTEX management, avoiding unnecessary deceleration. Energy efficiency is particularly relevant for Battery-Electric Vehicles (BEV), where poor performance leads to more frequent charging stops where no value is added to the transport solution.

Underutilization: With poor planning, vehicles are often stuck in states where no value is added. Examples are vehicles waiting to enter charging stations or loading/unloading areas. An efficient planner avoids this by performing MUTEX management and speed planning in such a way that waiting times are reduced, leading to more value increasing time spent in the transport solution and a smaller vehicle fleet.

Deadlocks: Some road network traffic layouts are prone to deadlocks, a situation where the vehicles cannot continue their missions without manual intervention in the form of reset. With a deadlock prone traffic layout, such situations will inevitably occur unless a traffic planner restricts access to certain areas at key instants.

Safety: With poor planning, it is possible for the system to be near dangerous states (e.g., risk of collision or similar) such that lower-level emergency systems are activated by small disturbances. An efficient planner avoids this by including sufficient margins.

Physical failure states: With poor planning, vehicles may enter states from which they cannot recover. An example is the complete stop of a heavily loaded vehicle in a steep incline. If stopped, the engine/motor and transmission in use can be such that it cannot be re-started. An efficient planner avoids this by pre-emptive speed planning.

Hardware wear: An efficient planner avoids unnecessary wear of the machinery, which for instance could be induced when heavy vehicles are decelerated with the service breaks repeatedly.

The problem of handling mutual exclusive resources has been addressed for industrial robots [16], [17], where different scheduling algorithms have been explored. The coordination of multiple AVs, however, adds a different aspect to the challenge, where for example, the dynamics of the vehicles and the road topology play a significant part in the optimization problem. The coordination of automated vehicles at intersections has been widely discussed in the literature recently, see [2] for a comprehensive survey. In general, the problem is difficult to solve, and was formally shown to be NP-hard in [15]. Often relying on simplifying assumptions and heuristics, a number of methods has been presented that solve the problem using, e.g., hybrid system theory [3], reinforcement learning [4], scheduling [5], model predictive control (MPC) [6], [7] or direct optimal control (DOC) [8], [9].

Coordination of AVs in confined areas has some distinct differences compared to the intersection scenarios often found in the literature. For instance, the full site-layout of confined areas is typically known at the planning stage, and it can often be expected that no non-controlled actors will disturb the execution of a plan once its formed. The motion of each vehicle can therefore be planned from the start of a transport mission to its end. Planning for confined sites is therefore benefited by methods that can handle long planning horizons. This in contrast to the intersection coordination context found in the literature, where a cutout around the intersection proper is most often considered, with vehicles arriving at speed at the intersection cutout [6], [7]. Moreover, in confined areas, the motion plan must consider coordination of the vehicles' use of a number of resources besides intersections, e.g., different variety of collision zones, and the quality of the plan has a direct and significant impact on the profit margins of the transport solution provider.

Direct optimal control is contemplated as a favorable type of method for solving the optimization problem. In the present disclosure, a two-stage heuristic for obtaining the optimal crossing order for each collision zone is utilized. The idea proposed in [9] is adapted to suit the goals in this application. The problem is formed in the space frame as it allows for optimizing the motion over the full vehicle path, as well as, allowing a more convenient handling of the collision constraints that occur in the collision zones. Furthermore, the collision constraints for the merge-split collision zone are defined such that the zone is not excluded for only one vehicle at a time, and the algorithm is modified to be able to handle these zones along with being able to handle multiple collision zones between vehicles. Although the approach focuses on confined sites, the method of handling the mutual exclusion zones is extendable to other scenarios as well (e.g., public road applications).

From similar scenarios that have been considered, the authors in and propose an optimization approach for handling merge scenarios, which is a subset of the merge-split collision zone and uses a game theoretical strategy for optimizing traffic flow through multiple intersection collision zones. The handling of multiple intersections and zones of different types were also identified in the survey [2] as topics for further work in this field.

SUMMARY

One objective of the present disclosure is to make available more widely applicable vehicle coordination techniques. A further objective is to enable planning over the entire site (a full plan covering the entire navigable environment of the vehicles) with at most a feasible effort increase. A further objective is to enable planning at all moments with at most a feasible effort increase. In particular, it is desired to remove the time horizon of the OCP and allow it to extend to the end of each vehicle's assigned transport mission. A further object is to enable planning for environments with multiple conflict zones (CZs). A further object is to enable planning for environments with at least one dwelling zone (e.g., charging, tipping, servicing), which is such that special vehicle dynamics apply to any vehicle therein, and/or at least one merge-split or narrow-road CZ.

At least some of these objectives are achieved by the invention as defined by the independent claims. The dependent claims relate to embodiments of the invention.

In a first aspect of the invention, there is provided a method of planning routes for a plurality of vehicles operating in a common environment which includes at least one CZ, wherein movements of each vehicle are controllable by a control signal. The method comprises: obtaining a predefined objective function J; solving a first optimization problem for a first objective function $V_i(T_i)$ derived from the predefined objective function, to obtain a vehicle crossing order at each CZ, wherein the first optimization problem is subject to safety constraints; and solving an optimal-control problem (OCP) for the predefined objective function subject to the vehicle crossing order at the CZs and subject to the safety constraints, to obtain a control signal $u_i$ for each of the vehicles. The OCP includes a dynamic vehicle model representing evolution with respect to path length $p_i$, in which time $t_i(p_i)$ and path speed $v_i(p_i)$ are state variables. The OCP includes such a model, for example, if the objective function for which it is being solved relates to a dynamic vehicle model representing evolution with respect to path length $(p_i)$, in which time $(t_i(p_i))$ and path speed $(v_i(p_i))$ are state variables.

The invention according to the first aspect enables the following advantages compared with the prior art. Because the OCP is formulated with path length (distance along the path) as the independent variable, rather than time, it becomes possible to plan over the entire site at all moments without significant effort increase. The use of path length also avoids certain numerical difficulties which affected the prior art, relating to requirements for computational resource and the complexity in formulating the OCP. Further, it becomes possible to handle CZs of other types than intersections, namely, the merge-split combination, charging stations, loading/unloading stops, tunnels and other single-lane passages. It becomes possible to account for all CZs present at a site. The use of path length as independent variable further allows the site state and topography (e.g., the road slope, the friction conditions on different parts, etc.) to be accounted for.

In some embodiments (First Approach), the this is implemented by letting the CZ entry and CZ exit times be decision variables of the first optimization problem. Alternatively, the first objective function is a parametric local optimum of the predefined objective function, wherein the parametric local optimum is parametrized by tentative CZ entry and CZ exit times and is independent of the safety constraints.

In other embodiments (Second Approach), the route planning is implemented by letting the pairwise relative vehicle crossing orders (b) as well as a state trajectory and control signal for each of the vehicles (W) be decision variables of the first optimization problem.

In a second aspect of the present invention, there is provided a method of controlling a plurality of vehicles operating in a common environment which includes at least one CZ, wherein movements of each vehicle is controllable by a control signal, the method comprising: sensing current positions P of all vehicles; obtaining a predefined objective function J; solving a first optimization problem for a first objective function $V_i(T_i)$ derived from the predefined objective function, to obtain a vehicle crossing order at each CZ, wherein the first optimization problem is subject to safety constraints and subject to the sensed vehicle positions; solving an optimal-control problem (OCP) for the predefined objective function subject to the vehicle crossing order at the CZs and subject to the safety constraints, to obtain a control signal $u_i$ for each of the vehicles; and feeding the control signal to the vehicles.

In a third aspect of the present invention, there is provided a device comprising memory and processing circuitry which is configured to perform the above method of planning routes for a plurality of vehicles operating in a common environment which includes at least one CZ, or to perform the above method of controlling these vehicles. The invention further relates to a computer program containing instructions for causing a computer, or the device in particular, to carry out the above methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

The second and third aspects of the invention generally share the effects and advantages of the first aspect, and they can be implemented with an equal degree of technical variation.

The term "conflict zone" may include a multiple-exclusion (MUTEX) zone.

The term "path length" refers to the vehicle's position constrained to a predefined path. As such, even though the vehicle is designed for two-dimensional motion, the path length is a one-dimensional quantity, which can be represented, e.g., as the distance $p_i$ from a reference point on the path. Similarly, path speed $v_i$ can be understood as the time derivative of the path length.

The term "route" may refer to a representation indicating a vehicle's position (e.g., a point in space) at different times. A "path" may refer to the set of positions that a vehicle has traversed or will traverse, without indicating when this occurred or will occur. As such, a route may be considered to be a function from time to space, whereas a path is a static quantity.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

Embodiments of the disclosed invention may enable one or more of the following:
- State explicit performance objectives and ability to determine how these should be traded off between each other.
- State explicit system constraints (e.g., individual transport mission deadlines, speed and acceleration limits etc.).
- Include explicit safety constraints with tunable margins.
- Incorporate physical constraints and effects (e.g., the vehicle dynamics and propulsion system efficiency, including the effect increased energy consumption induced by uphill driving, or utilize the potential energy acquired by a vehicle at a hill).
- Incorporate the energy state of a vehicle to automatically determine when a BEV should be charged.
- Introduce explicit priorities among the vehicles.
- Introduce feedback: the traffic plan can be recomputed at a high rate to handle deviations from the current plan.
- Have flexibility in tuning, all the above can be changed on-the fly, leading to situations where the overall system behavior can be changed at-will (e.g., changing prioritization between throughput and energy efficiency depending on customer needs).
- Perform site-wide optimization considering complete vehicle trajectories and the site topology and all conflict zones, simultaneously.

BRIEF DESCRIPTION OF THE DRAWINGS

Aspects and embodiments are now described, by way of example, with reference to the accompanying drawings.

FIG. 1A illustrates an intersection CZ.

FIG. 1B illustrates a merge-split CZ.

FIG. 1C illustrates a narrow road section.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Problem Formulation

For the confined site coordination problem, $N_a$ vehicles that need to be coordinated efficiently through different types of exclusion zones without collisions are considered. Assuming a confined site means that no unexpected traffic participants are present, i.e., no other vehicles than the planned ones, no pedestrians, etc. Furthermore, all coordinated vehicles are assumed to be automated, capable to communicate, their full paths and common exclusion zones are known a priori and overtakes do not occur.

Figure 14:
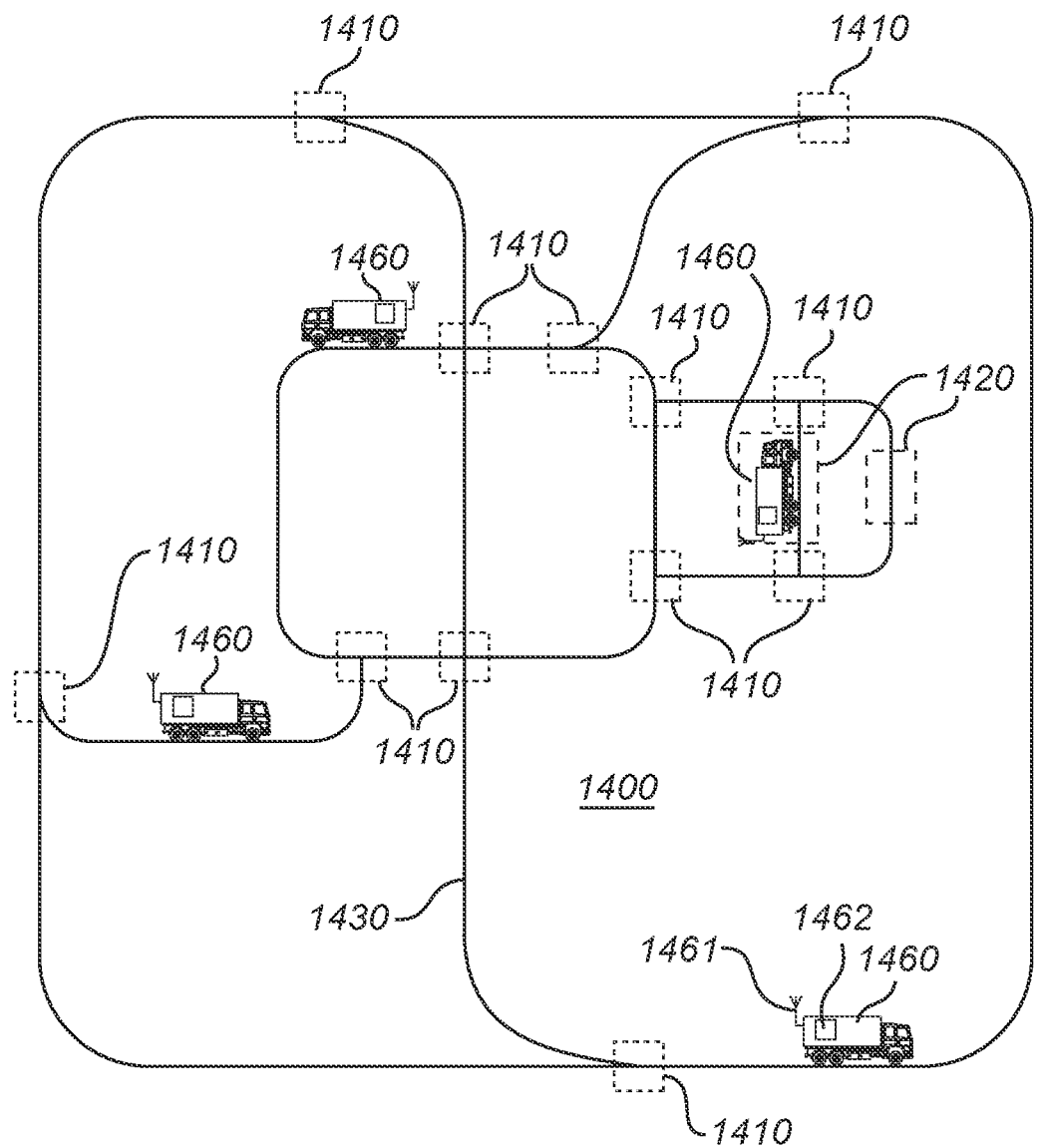
FIG. 14 shows an environment with multiple intersection CZs, merge-split CZs and dwelling-type CZs, in which a plurality of vehicles operates, as well as a device suitable for controlling said vehicles is deployed.
Figure 14:
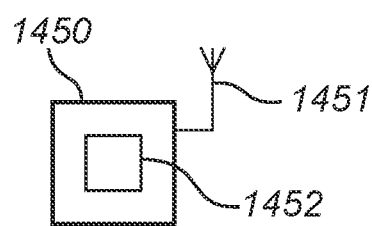

FIG. 14 shows an environment 1400 in which a plurality of vehicles 1460 operate. The environment 1400 includes roads 1430 as well as multiple intersection CZs 1410, merge-split CZs 1410 and dwelling-type CZs (dwelling zones) 1420. The environment 1400 may be a confined area with no other traffic participants than the vehicles 1460. The vehicles 1460 may be conventional vehicles, partially autonomous vehicles or fully autonomous vehicles; they may be cars, trucks, buses, construction equipment; they may be single vehicles or multi-unit vehicle combinations. Also visible in FIG. 14 is a device 1450 suitable for controlling said vehicles 1460. The device 1450 includes processing circuitry 1452 and is configured to communicate over a wireless interface 1451 with corresponding wireless interfaces 1461 on the vehicles 1460. As indicated for one example vehicle 1460, the vehicles 1460 circulating in the environment 1400 may further include vehicle-carried processing circuitry 1462.

Vehicle Model

The motion of the vehicles along their path is described by $$\dot{p}_i(t) = v_i(t)$$

$$\dot{x}_i(t) = f_i(p_i(t), x_i(t), u_i(t))$$

$$0 \le h_i(p_i(t), x_i(t), u_i(t)),$$

where $p_i(t) \in \mathbb{R}^n$ is the position, $x_i(t) \in \mathbb{R}^m$ the vehicle state, $u_i(t) \in \mathbb{R}^m$ the control input, and $i$ is a vehicle index. The state is subdivided as $x_i(t) = (v_i(t), z_i(t))$, with the speed along the path $v_i(t) \in \mathbb{R}$ and $z_i(t) \in \mathbb{R}^{n-1}$ collecting possible other states. The functions $f_i$ and $h_i$ describe respectively the dynamics and constraints that capture, e.g., actuator and speed limits. Both functions are assumed to be smooth.

Vehicle Model in Space

For confined site optimization a main interest is to optimize the trajectories of the vehicles over the whole site, i.e., over their full paths. However, the time it takes a vehicle to traverse a path is unknown. Therefore, the necessary time horizon is undefined, making the coordination problem difficult to formulate with time as the independent variable. Due to this, the problem is reformulated "in space", using that $$\frac{dp_i}{dt} = v_i(t) \text{ gives } dt = dp_i/v_i(t).$$

The spatial dynamics are $$\frac{dt_i}{dp_i} = \frac{1}{v_i(p_i)} \quad (4,5,6)$$

$$\frac{dx_i}{dp_i} = \frac{1}{v_i(p_i)} f_i(p_i, x_i(p_i), u_i(p_i))$$

$$0 \le h(p_i, x_i, u_i),$$

where the position $p_i$ is the independent variable.

Conflict Zone Modelling

A conflict zone (CZ) is described by the entry and exit position $[p_i^{in}, p_i^{out}]$ on the path of each vehicle. From the known positions, the entry and exit times through the CZ ($t_i^{in}, t_i^{out}$) can be defined. In the present disclosure, two types of conflict zones are considered as depicted in FIG. 1. Let $\mathcal{I} = \{I_1, I_2, \ldots, I_{r_0}\}$ denote a set of all intersections (total number: $r_0$) in the confined site and $Q_r = \{q_{r,1}, q_{r,2}, \ldots, q_{r,l}\}$ denote the set of vehicles that cross intersection $I_r$. In the intersection-like CZ, it is desired to only have one vehicle inside the CZ, i.e., not allowing the vehicle $j$ to enter the CZ before vehicle $i \ne j$ exits the CZ, or vice-versa. The order in which the vehicles cross the intersection $I_r$ is denoted $\mathcal{O}_r^{\mathcal{I}} = (s_{r,1}, s_{r,2}, \ldots, s_{r,|Q_r|})$, where $s_{r,1}, s_{r,2}, \ldots$ are vehicle indices and $\mathcal{O}^{\mathcal{I}} = \{\mathcal{O}_1^{\mathcal{I}}, \ldots, \mathcal{O}_r^{\mathcal{I}}\}$. A sufficient condition for collision avoidance for the r-th intersection CZ can be formulated as $$t_{s_{r,i}}\left(p_{s_{r,i}}^{out}\right) \le t_{s_{r,i+1}}\left(p_{s_{r,i+1}}^{in}\right), i \in \mathbb{I}_{[1,|Q_r|-1]}, \quad (7)$$

where t is determined from (4).

In the merge-split CZ case, let $\mathcal{M} = \{M_1, M_2, \ldots, M_{w_0}\}$ denote a set of all merge-split zones (total number: $w_0$) in the site and $\mathcal{Z}_w = \{z_{w,1}, z_{w,2}, \ldots, z_{w,h}\}$ denote the set of vehicles that cross the merge-split CZ $M_w$. It is desired to have the vehicles in the zone at the same time, instead of blocking the whole zone, and thus increasing throughput efficiency. This requires having rear-end collision constraints once the vehicles have entered the CZ safely. In this case, the order in which the vehicles enter the zone is denoted as $\mathcal{O}_w^{\mathcal{M}} = (s_{w,1}, s_{w,2}, \ldots, s_{w,|z_w|})$, and $\mathcal{O}^{\mathcal{M}} = \{\mathcal{O}_1^{\mathcal{M}}, \ldots, \mathcal{O}_w^{\mathcal{M}}\}$. The collision avoidance requirement for this w-th CZ leads in having to enforce the following constraints:

$$t_{s_{w,i}}\left(p_{s_{w,i}}^{in}\right) + \Delta t \le t_{s_{w,i+1}}\left(p_{s_{w,i+1}}^{in} + c\right) \quad (8)$$

$$t_{s_{w,i},k_i} + \Delta t \le t_{s_{w,i+1}}\left(p_{s_{w,i},k_i} - p_{s_{w,i}}^{in} + p_{s_{w,i+1}}^{in} + c\right),$$

$$k_{s_{w,i}}^{in} \le k_i \le k_{s_{w,i}}^{out}$$

$$t_{s_{w,i}}\left(p_{s_{w,i}}^{out}\right) + \Delta t \le t_{s_{w,i+1}}\left(p_{s_{w,i+1}}^{out} + c\right),$$

$$i \in \mathbb{I}_{[1,|Z_w|-1]}.$$

The time $\Delta t$ above is added for an additional constant time gap. However, only including a time gap would lead to the problem that at low speeds the vehicles would be very close to each other, unless $\Delta t$ is not very large. Large $\Delta t$, on the other hand, would lead to too large distance between the vehicles at high speeds. Therefore, a constant c is included as well. Assuming that the vehicles do not reverse, the velocity of a moving vehicle is larger than zero, meaning c>0.

Method—First Approach

Optimal Control Problem

A direct optimal control approach is used to solve the problem. The independent variable is discretized as $p_i = (p_{i,1}, \ldots, p_{i,N_i})$, the input approximated using zero order hold such that $u(p) = u_{i,k}$, $p \in [p_{i,k}, p_{i,k+1}]$, and equations (4, 5) are (numerically) integrated on this grid, giving the "discretized" state transition relation $$\begin{bmatrix} t_{i,k+1} \\ x_{i,k+1} \end{bmatrix} = F(x_{i,k}, u_{i,k}, p_{i,k}, p_{i,k+1}),$$

where F denotes the integration of (4, 5) from $p_{i,k}$ to $p_{i,k+1}$. Using this, the problem of finding the optimal vehicle trajectories that avoid collisions can be formalized as:

(Optimal Coordination Problem) Obtain the optimal state and control trajectories $\mathcal{X}^* = \{x^*_1, \ldots, x^*_{N_a}\}$, $\mathcal{U}^* = \{u^*_1, \ldots, u^*_{N_a}\}$, given the initial state $\mathcal{X}_0 = \{x_{1,0}, \ldots, x_{N_a,0}\}$, by solving the optimization problem $$\min_{x_{i,k}, u_{i,k}, \mathcal{O}^{\mathcal{J}}, \mathcal{O}^{\mathcal{M}}} \sum_{i=1}^{N_a} J_i(x_{i,k}, u_{i,k}) \tag{10a}$$

subject to initial guess $x_{i,0} = \hat{x}_{i,0}$ (10b)

system dynamics (9) (10c)

state and input constraints (6) (10d)

safety constraints (7), (8). (10e)

Note in particular that this involves finding the crossing orders $\mathcal{O}^{\mathcal{J}}$, $\mathcal{O}^{\mathcal{M}}$, which makes the problem combinatorial and difficult to solve.

Problem (10) can be solved as Mixed Integer Nonlinear Program (MINLP). However, finding a solution to such problems is known to be difficult, especially when the constraints or the objective function are non-convex. Therefore, a common procedure is to apply an approach where the integer part of the solution is obtained first using a heuristic, and the continuous part of the solution thereafter obtained by solving the nonlinear program (NLP) that results from fixing the integers to the values found with the heuristic. This approach is followed in the present disclosure. The heuristic that is used is similar to that of [9] and approximates the integer solution of (10) by solving a Mixed Integer Quadratic Problem (MIQP). With the integer solution given, the state and control trajectories are obtained by solving the "fixed-order coordination" NLP, i.e., Problem (10) with fixed crossing orders $\mathcal{O}^{\mathcal{J}}$, $\mathcal{O}^{\mathcal{M}}$.

Crossing Order Heuristic

The crossing order heuristic follows the procedure proposed in [9] where the coordination problem is approximated as time-slot scheduling MINLP in T, where $T = (T_i, \ldots, T_{N_a})$ and $T_i$ the set of entry and exit times for vehicle i for all the CZ it encounters. With this formulation, the integer part of the solution, i.e., the crossing orders, are treated in T space. The problem reads:

$$\min_{T, \mathcal{O}^{\mathcal{J}}, \mathcal{O}^{\mathcal{M}}} \sum_{i=1}^{N_a} V_i(T_i) \tag{11a}$$

subject to $T_i \in dom(V_i) \forall = 1, \ldots, N_a$ and (7), (8), (11b)

where $dom(V_i)$ is the domain of the function $V_i$. The definition of $V_i(T_i)$ follows next.

The Vehicle problem: The function $V_i(T_i)$ is the optimal value function of the following parametric optimal control problem, denoted the "Vehicle Problem":

$$V_i(T_i) = \min_z J_i(x_i, u_i) \tag{12a}$$

subject to (6), (9), (10b) (12b)

$\xi_i^{in} = t_i^{in}$ (12c)

$\xi_i^{out} = t_i^{out}$ (12c)

with $\xi_i$ being the parameter over which optimization is performed. Note that $dom(V_i)$ thereby is the set of parameters $T_i$ for which (12) has a solution.

An MIQP-based heuristic: The time-slot scheduling MINLP (11) is still a difficult problem, with non-convex objective function and constraints. Motivated by the availability of efficient solvers, the following MIQP approximation of (11) is considered:

$$\min_T \sum_{i=1}^{N_a} \frac{1}{2} T_i^T \nabla^2 V_i T_i + \left(\nabla V_i - \nabla^2 V_i T_i^{[0]}\right)^T T_i \tag{13a}$$

subject to (7), (8), (13b)

where the derivatives are evaluated at $T_i^{[0]}$, which is obtained from the first step of Algorithm 1 below. Note that besides using the first and second order Taylor expansion of the objective function and constraints, respectively, the constraint $dom(V_i)$ is removed. This is motivated by the conclusions in [9].

The solution to the MIQP problem provides an approximately optimal time-slot schedule T and therefore an approximate crossing orders $\hat{\mathcal{O}}^{\mathcal{J}}$, $\hat{\mathcal{O}}^{\mathcal{M}}$.

A comment on differentiation of $V_i(T_i)$: From the solution of the parametric NLP (12), the first and second order derivatives w.r.t. the parameter can be calculated using the parametric sensitivity analysis [14]. In particular, this can be done at a low additional cost when the optimal problem is solved. Note that for a solution to problem (12), feasible entry and exit times, i.e., feasible values for the parameters, for each CZ that vehicle i encounters are necessary. These times can, for example, be computed by solving an optimization problem without the safety constraints.

Fixed-Order NLP

With the found crossing order, the integer part of the solution is obtained, making (10) a NLP. Obtaining the optimal state and control trajectories is thus found through solving the fixed-order coordination problem $$\min_{x_{i,k}, u_{i,k}} \sum_{i=1}^{N_a} J_i(x_{i,k}, u_{i,k}) \tag{14a}$$

subject to (10b), (10c), (10d), (10e) (14b)

$\mathcal{O}^{\mathcal{J}} = \hat{\mathcal{O}}^{\mathcal{J}}, \mathcal{O}^{\mathcal{M}} = \hat{\mathcal{O}}^{\mathcal{M}}$ (14c)

Figure 2A:
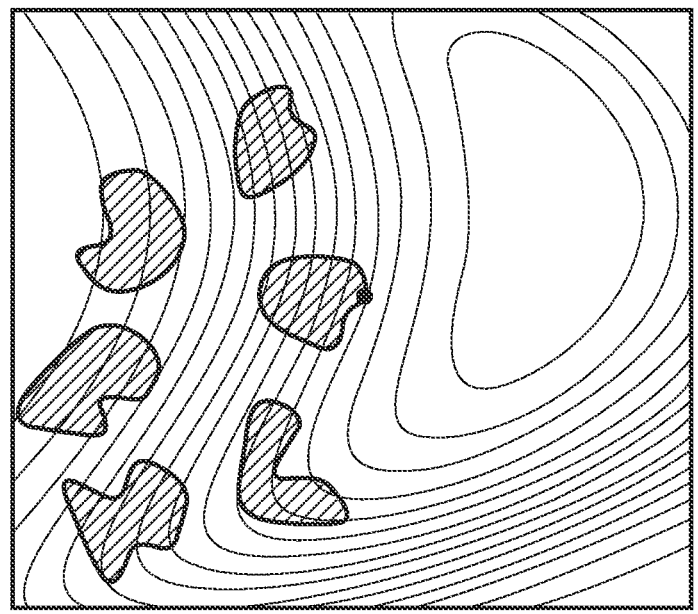
FIG. 2A is an illustration of the heuristic approach for when an original problem is a non-convex problem with a disconnected solution space.
Figure 2B:
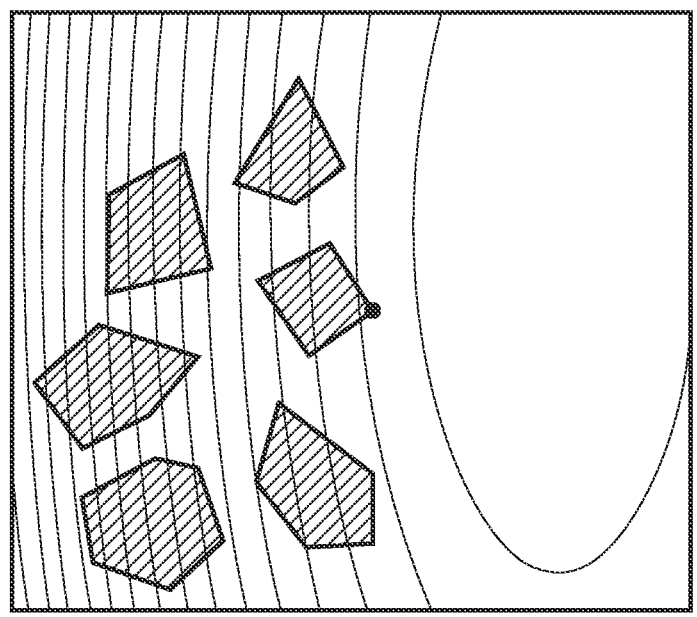
FIG. 2B shows the MIQP approximation of the original problem, which approximation allows for finding a region where the solution of the original problem could be.
Figure 2C:
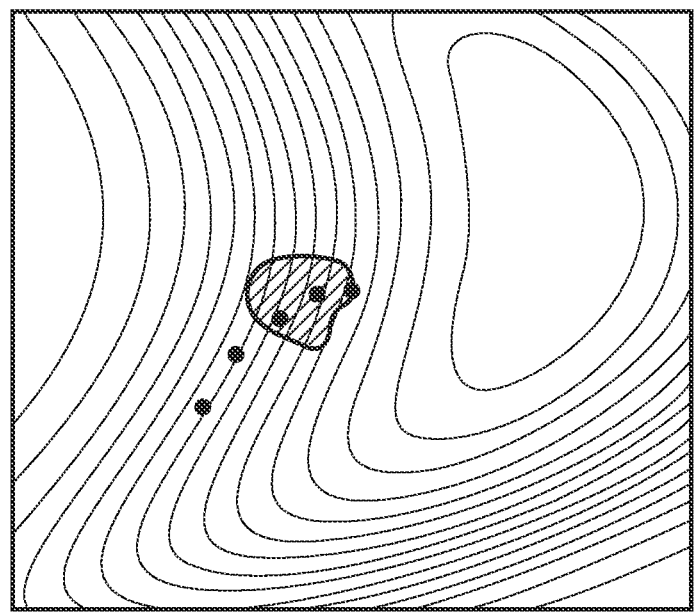
FIG. 2C shows through the fixed-order NLP), the approximate optimal solution is acquired.

The two stage approximation approach is summarized in Algorithm 1 and depicted in FIG. 2.

Algorithm 1

Input: $N_a$, $\mathcal{J}$, $\mathcal{Q}_r$, $\mathcal{M}$, $\mathcal{Z}_w$, vehicle paths Output: $\mathcal{X}^*$, $\mathcal{U}^*$ 1. For all i, solve NLP (10) without safety constraints (7), (8) to obtain feasible entry and exit times $T_i^{[0]}$.
2. For all i, solve NLP (12) and calculate the first- and second-order sensitivities ($\nabla V_i$, $\nabla^2 V_i$).
3. Solve MIQP (13) for the approximate crossing orders $\hat{\mathcal{O}}^{\mathcal{J}}$, $\hat{\mathcal{O}}^{\mathcal{M}}$.
4. Solve the fixed-order NLP (14) using $\hat{\mathcal{O}}^{\mathcal{J}}$, $\hat{\mathcal{O}}^{\mathcal{M}}$ and obtain $\mathcal{X}^*$, $\mathcal{U}^*$.

Method—Second Approach

A Practical Reformulation of the Collision Constraints

A common way to handle constraints such as (7) and (8) is to introduce auxiliary binary variables and use the "big- M" technique. For example, an equivalent representation to the constraint (7), with $b_{s_r,i,i+1} \in \{0,1\}$, $i \in \mathbb{I}_{[1,|Q_r|-1]}$ and a sufficiently large M is $$t_{s_r,i}(p_{s_r,i}^{out}) - t_{s_r,i+1}(p_{s_r,i+1}^{in}) \leq b_{s_r,i,i+1} M,$$

$$t_{s_r,i+1}(p_{s_r,i+1}^{out}) - t_{s_r,i}(p_{s_r,i}^{in}) \leq (1-b_{s_r,i+1}) M.$$

In the case where $b_{s_r,i+1}=0$, the vehicle i+1 is constrained to cross the CZ after the vehicle i, with the opposite being true if $b_{s_r,i,i+1}=1$. All integer variables for all CZs are connected in $b \in \mathbb{Z}_2^{r_0+w_0}$. This is to say, b corresponds to pairwise relative crossing orders.

Optimal Control Problem

In the Second Approach too, a direct optimal control approach is used to solve the problem. The independent variable is discretized as $p_i = (p_{i,1}, \ldots, p_{i,N_i})$, the input approximated using zero order hold such that $u(p) = u_{i,k}$, $p \in [p_{i,k}, p_{i,k+1}[$, and equations (4, 5) are (numerically) integrated on this grid, giving the "discretized" state transition relation $$\begin{bmatrix} t_{i,k+1} \\ x_{i,k+1} \end{bmatrix} = F(x_{i,k}, u_{i,k}, p_{i,k}, p_{i,k+1}),$$

where F denotes the integration of (4, 5) from $p_{i,k}$ to $p_{i,k+1}$. As seen, the problem of finding the optimal vehicle trajectories that avoid collisions can then be formalized as the above-stated Optimal Coordination Problem.

The Optimal Coordination Problem (10) can be expressed as a Mixed Integer Nonlinear Program (MINLP), where the crossing order correspond to the combinatorial ("integer part") and the state and control trajectories corresponds to the "NLP part". In essence, the Optimal Coordination Problem can be stated as $$\min_{\mathcal{W},b} J(\mathcal{W}) \quad (15)$$

$$\text{s.t.} \quad g(\mathcal{W}) = 0$$

$$h(\mathcal{W}) \leq 0$$

$$c(\mathcal{W}, b) \leq 0$$

where $\mathcal{W} = \{\mathcal{X}, \mathcal{U}\}$, $J(\mathcal{W}) = \Sigma_{i=1}^{N_a} J_i(w_i)$, $g(\mathcal{W})$, $h(\mathcal{W})$ gather all equality and inequality constraints, and $c(\mathcal{W}, b) = c_w(\mathcal{W}) + Cb$ are the integer constraints for the combinatorial part of the problem with C a matrix that captures the influence of the integer variables.

Since finding a solution to MINLP problems is known to be difficult, a common way of obtaining a solution is through a two-stage approximation procedure. In this disclosure, under the Second Approach, this way is followed and an alternative heuristic is proposed.

Crossing Order Heuristic

The crossing order heuristic is based on solving an MIQP that is assembled from a quadratic approximation of (15). The quadratic approximation is formed in a similar fashion as QP sub-problems are formed in SQP methods. In essence, (15) can be reformulated as:

$$\min_{\mathcal{W},b} \frac{1}{2}\begin{bmatrix} \Delta \mathcal{W} \\ b \end{bmatrix}^T H(\mathcal{W}, \lambda, \mu)\begin{bmatrix} \Delta \mathcal{W} \\ b \end{bmatrix} + \nabla_{\mathcal{W}} J(\mathcal{W})^T \begin{bmatrix} \Delta \mathcal{W} \\ b \end{bmatrix} + J(\mathcal{W}^{**}) \quad (16a)$$

$$\text{s.t.} \quad g(\mathcal{W}^{}) + \nabla_{\mathcal{W}} g(\mathcal{W}^{})^T \begin{bmatrix} \Delta \mathcal{W} \\ b \end{bmatrix} = 0 \quad (16b)$$

$$h(\mathcal{W}^{}) + \nabla_{\mathcal{W}} h(\mathcal{W}^{})^T \begin{bmatrix} \Delta \mathcal{W} \\ b \end{bmatrix} \leq 0$$

$$c_{\mathcal{W}}(\mathcal{W}^{}) + \nabla_{\mathcal{W}} c_{\mathcal{W}}(\mathcal{W}^{})^T \begin{bmatrix} \Delta \mathcal{W} \\ b \end{bmatrix} + Cb \leq 0$$

where $$H(\mathcal{W}, \lambda, \mu) = blkdiag(\{H_i\}_{i=1}^{N_a}, 0_{r_0+w_0, r_0+w_0})$$

is a positive-definite block diagonal matrix with $H_i(w_i, \lambda_i, \mu_i) = \nabla_{w_i}^2 \mathcal{L}(w_i, \lambda_i, \mu_i) = \nabla_{w_i}^2 J_i(w_i) - \nabla_{w_i}^2 \lambda_i^T g(w_i) - \nabla_{w_i}^2 \mu_i^T h(w_i)$, where $\lambda_i, \mu_i$ are the dual variables and zeros of appropriate size for the integer variables, and $\Delta \mathcal{W} = \mathcal{W} - \mathcal{W}^{}$, with a solution guess (solution conjecture) $\mathcal{W}^{}$. The constant term $J(\mathcal{W}^{})$ can be discarded. For the heuristic used in the Second Approach, a simplification is made by which the dual variables ($\lambda_i, \mu_i$) are equal to zero. This results in that the hessian only includes the expansion of the cost function, i.e., $H_i(w_i) = \nabla_{w_i}^2 J(w_i)$. The solution guess $\mathcal{W}^{}$ can be obtained, for example, by solving the optimization problem (10) without safety constraints (10e), or by a forward simulation of the vehicles with, for example, an LQR controller.

The MIQP problem (16) can be compactly rewritten as $$\min_{\mathcal{W},b} \frac{1}{2}\begin{bmatrix} \mathcal{W} \\ b \end{bmatrix}^T H \begin{bmatrix} \mathcal{W} \\ b \end{bmatrix} + J^T \begin{bmatrix} \mathcal{W} \\ b \end{bmatrix} + \alpha \quad (17)$$

$$\text{s.t.} \quad A_{eq} \begin{bmatrix} \mathcal{W} \\ b \end{bmatrix} = b_{eq}$$

$$A_{ineq} \begin{bmatrix} \mathcal{W} \\ b \end{bmatrix} \leq b_{ineq}$$

where J now contains all the first order terms, a contains the linear terms and where the constraints in (16) are grouped as $A_{eq}, A_{ineq}, b_{eq}, bi_{neq}$ in (17). The solution to the MIQP problem provides an approximately optimal crossing orders $\hat{O}^{\mathcal{J}}$, $\hat{O}^{\mathcal{M}}$ that is obtained from the values of the integer variables b. The $\mathcal{W}$ component of the solution, which corresponds to the state trajectory and control signal for each of the vehicles, can be discarded from this step.

Fixed-Order NLP

With the found crossing order, the integer part of the solution is obtained, making (10) a NLP. Obtaining the optimal state and control trajectories is thus found through solving the fixed-order coordination problem $$\min_{x_{i,k}, u_{i,k}} \sum_{i=1}^{N_a} J_i(x_{i,k}, u_{i,k}) \quad (18a)$$

$$\text{subject to (10b), (10c), (10d), (10e)} \quad (18b)$$

$$O^{\mathcal{J}} = \hat{O}^{\mathcal{J}}, O^{\mathcal{M}} = \hat{O}^{\mathcal{M}} \quad (18c)$$

The two-stage approximation approach is summarized in Algorithm 2 and illustrated in FIG. 2.

Algorithm 2

Input: $N_a, \mathcal{J}, \mathcal{Q}_r, \mathcal{M}, \mathcal{Z}_w$, vehicle paths Output: $\mathcal{X}^*, \mathcal{U}^*$ 1. For all i, obtain a solution guess $w_i^{**}$ by, e.g., solving NLP (10) without safety constraints (7), (8).
2. Calculate and form the approximation terms H, J, α.

3. Solve MIQP (17) for the approximate crossing orders $\hat{O}^J, \hat{O}^M$.

4. Solve the fixed-order NLP (18) using $\hat{O}^J, \hat{O}^M$ and obtain $\mathcal{X}*, \mathcal{U}*$.

Simulation Results

In this section, a simulation example showing the operation and performance of the coordination algorithm will be presented.

Simulation Setup

The vehicles are modelled as a triple integrator $\ddot{x}=u$, whereby the spatial model is:

$$\begin{bmatrix} \frac{dt_i}{dp_i} \\ \frac{dv_i}{dp_i} \\ \frac{da_i}{dp_i} \end{bmatrix} = \begin{bmatrix} 1/v_i & 0 & 0 \\ 0 & 1/v_i & 0 \\ 0 & 0 & 0 \end{bmatrix} x_i + \begin{bmatrix} 0 \\ 0 \\ 1/v_i \end{bmatrix} u_i,$$

where $a_i$ is the acceleration and $u_i$ is the jerk. The dynamics are discretized using multiple shooting and an Explicit Runge-Kutta-4 (ERK4).

The constraints are chosen as bounds on the speed and longitudinal acceleration ($\underline{v}_i \leq v_{i,k} \leq \overline{v}_i$, $a_{i,k} \leq \overline{a}_{i,lon}$) in order to obey speed limits and physical constraints. The vehicles are expected to manoeuvre on curved roads, thus, it is needed to consider the lateral forces they experience. As the one-dimensional model that is used in this disclosure does not account for lateral motion, the following constraint is enforced, as similarly proposed in [8]:

$$\left(\frac{a_{i,k}}{\overline{a}_{i,lon}}\right)^2 + \left(\frac{\kappa_i(s_{i,k})v_{i,k}^2}{\overline{a}_{i,lat}}\right)^2 \leq 1,$$

where $\overline{a}_{i,lat}$ is the lateral acceleration limit and $\kappa_i(p_{i,k})$ is the road curvature, that is assumed to be available at every point along the path.

In this disclosure, under the First Approach, it is of interest to minimize the change of acceleration and jerk in order for the vehicles to operate in a comfortable way. Minimizing the acceleration and jerk would also lead to a reduction in fuel/energy consumption. This requirement leads to the following objective function for each vehicle:

$$J_i(x_{i,k}, u_{i,k}) = \sum_{k=1}^{N}\left((P_i \cdot a_{i,k}^2 + Q_i \cdot u_{i,k}^2) \cdot \frac{\Delta p_{i,k}}{v_{i,k}}\right) + R_i \cdot t_{f,i},$$

with $\Delta p_{i,k} = p_{i,k+1} - p_{i,k}$, $P_i, Q_i, R_i$ the appropriate weights and $t_{f,i}$ being the final time.

Figure 3:
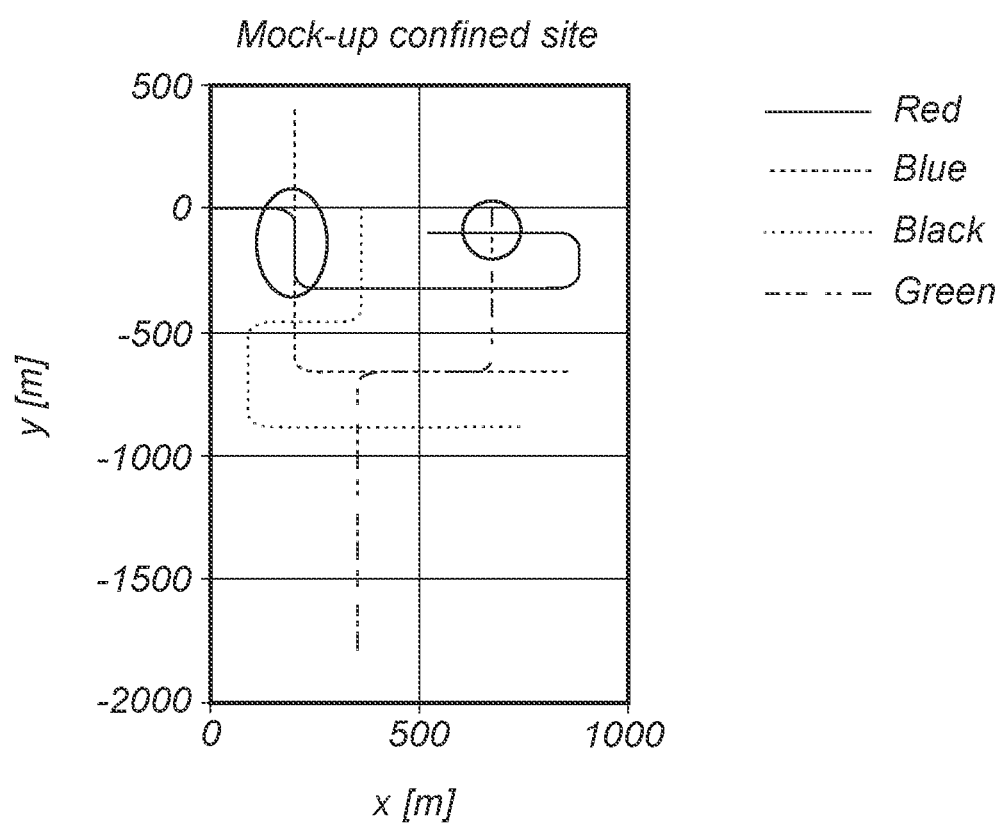
FIG. 3 shows a mock-up confined site area together with a legend of the line styles to be used in FIGS. 4 to 12.

For evaluation purposes, a mock-up confined area with four vehicles as depicted in FIG. 3 will be investigated. There are in total two merge-split CZs and five intersection CZs. Every vehicle starts from an initial velocity of 50 [km/h] and the chosen bounds are $\underline{v}_i = 3.6$ [km/h], $\overline{v}_i = 90$ [km/h], $\overline{a}_{i,lon} = 4$ [m/s²], $\overline{a}_{i,lat} = 2$ [m/s²]. The weight coefficients for the optimal problem are: $P_i = 1$, $Q_i = 1$, $R_i = 10$. The total shooting points for this scenario is N=100 and is same for all vehicles. In the intersection-like scenario the CZ is created with 5 meter margin ahead of and behind the collision point, whereas in the merge-split scenario the margin is 15 meters for both the entry and exit collision point. For the merge-split CZ it is also desired to keep at least 0.5 s margin between the vehicles.

The Casadi [18] toolkit with the IPOPT [19] solver will be utilized for solving the optimization problems (12, 14) and Gurobi for solving the MIQP problem (13).

Figure 16:
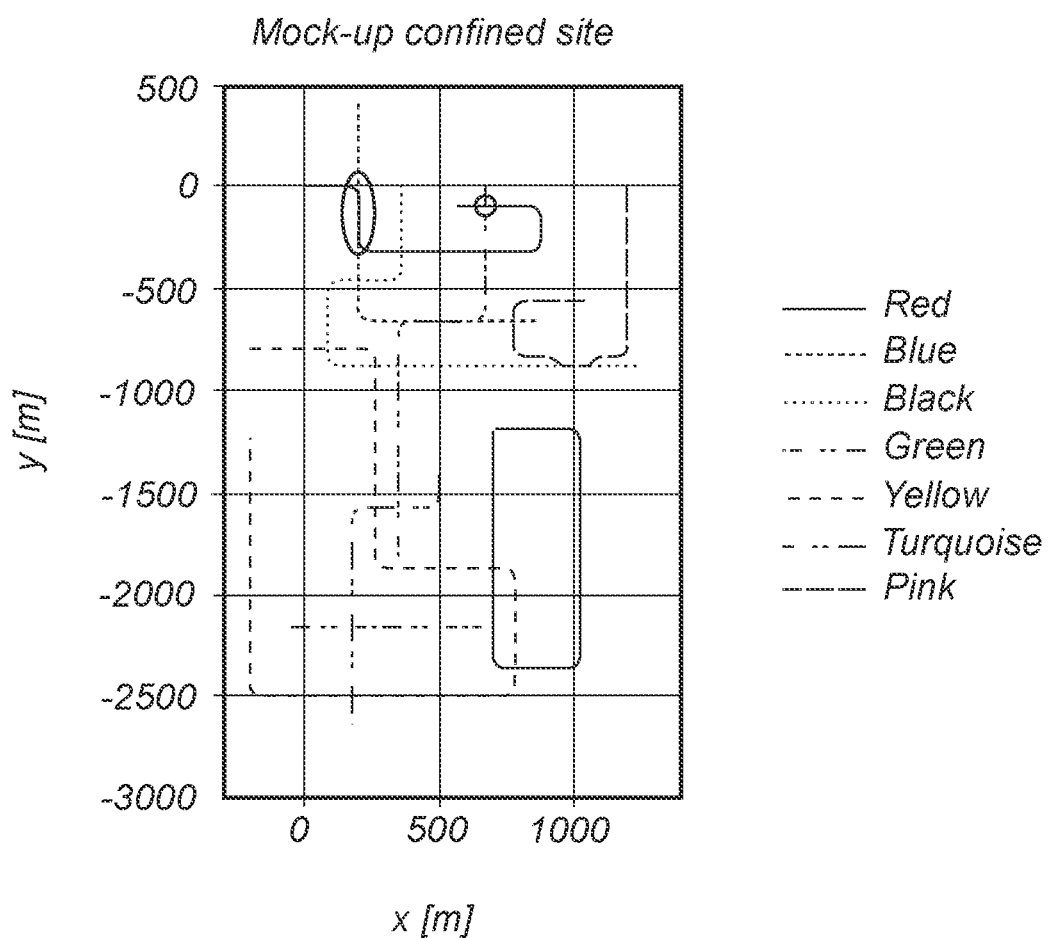
FIG. 16 shows a mock-up confined site area together with a legend of the line styles to be used in FIGS. 17 to 19.

Under the Second Approach, the following trade-off between minimization of the total travel time and the squares of the longitudinal acceleration and longitudinal jerk is considered:

$$J(x_i(p_i), u_i(p_i)) = \int_{p_{i,0}}^{p_{i,N_i}} (P_i a_i(p_i)^2 + Q_i j_i(p_i)^2)\frac{1}{v_i(p_i)}dp_i + R_i t_i(p_{i,N_i}),$$

where $P_i, Q_i, R_i$ are the appropriate weights. This objective is integrated with Forward Euler, leading to the "discretized" objective expression $$J_i(x_{i,k}, u_{i,k}) = \sum_{k=1}^{N}\left((P_i a_{i,k}^2 + Q_i j_{i,k}^2)\frac{\Delta p_{i,k}}{v_{i,k}}\right) + R_i t_{i,N},$$

with $\Delta p_{i,k} = p_{i,k+1} - p_{i,k}$. For evaluation purposes, the mock-up confined area depicted in FIG. 16 will be investigated. There are in total ten vehicles and two merge-split CZs, two narrow road CZs and sixteen intersection CZs. Every vehicle starts from an initial velocity of 50 km/h, and furthermore vehicle 5 and vehicle 10 start from a nonzero initial time for the purpose of the interacting vehicles to occupy the CZ at the same time. The respective initial times for those vehicles are $t_{0,5}=56$ and $t_{0,10}=11.3$ seconds. The chosen velocity and acceleration bounds are $\underline{v}_i=3.6$ [km/h], $\overline{v}_i=90$ [km/h], $\overline{a}_{i,lon}=4$ [m/s²], $\overline{a}_{i,lat}=2$ [m/s²]. The weight coefficients for the optimal problem are: $P_i=1$, $Q_i=1$, $R_i=10$. The total shooting points for this scenario is N=100 and is same for all vehicles. In the intersection-like scenario the CZ is created with 5 meter margin ahead of and behind the collision point, where as in the merge-split and narrow road scenarios the margin is 15 meters for both the entry and exit collision point. For the merge-split CZ it is also desired to keep at least 0.5 s margin between the vehicles. The CasADi toolkit [18] with the IPOPT solver [19] is used for solving the optimization problem (14) and Gurobi for solving the MIQP problem (12).

Discussion of Results

In the following, the results for this simulation scenario are presented and, in particular, the uncoordinated and coordinated results for one merge-split zone and one intersection zone, both circled over in FIG. 3. The uncoordinated results are obtained as the individual optimum of each vehicle, i.e., the speed profiles are obtained by solving the optimization problem without any safety constraints.

Figure 4:
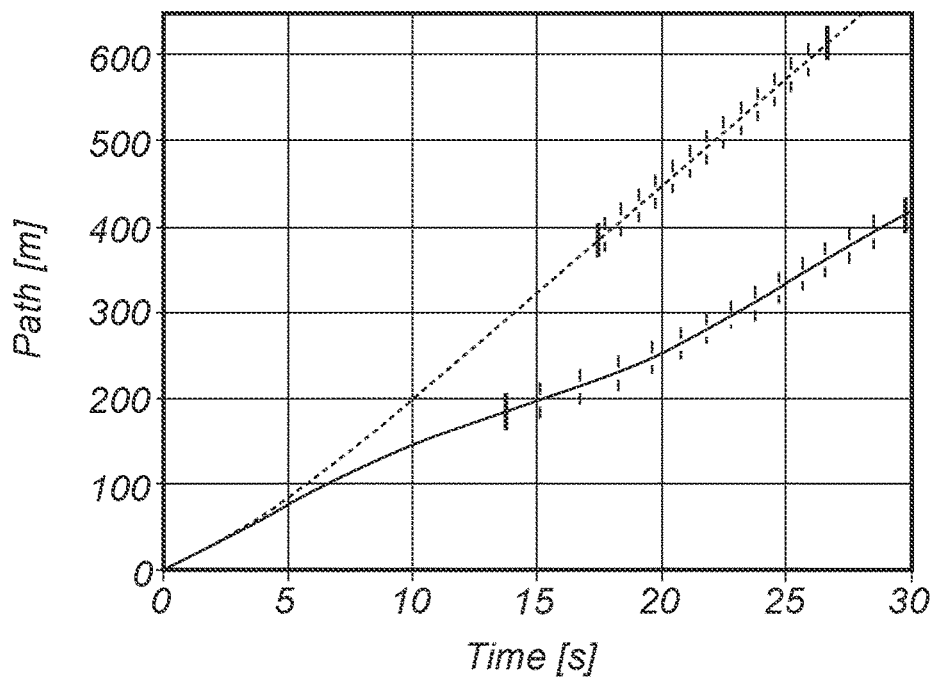
FIG. 4 shows uncoordinated crossing for the merge-split CZ for the red vehicle (solid curve) and blue vehicle (dashed curve).
Figure 5:
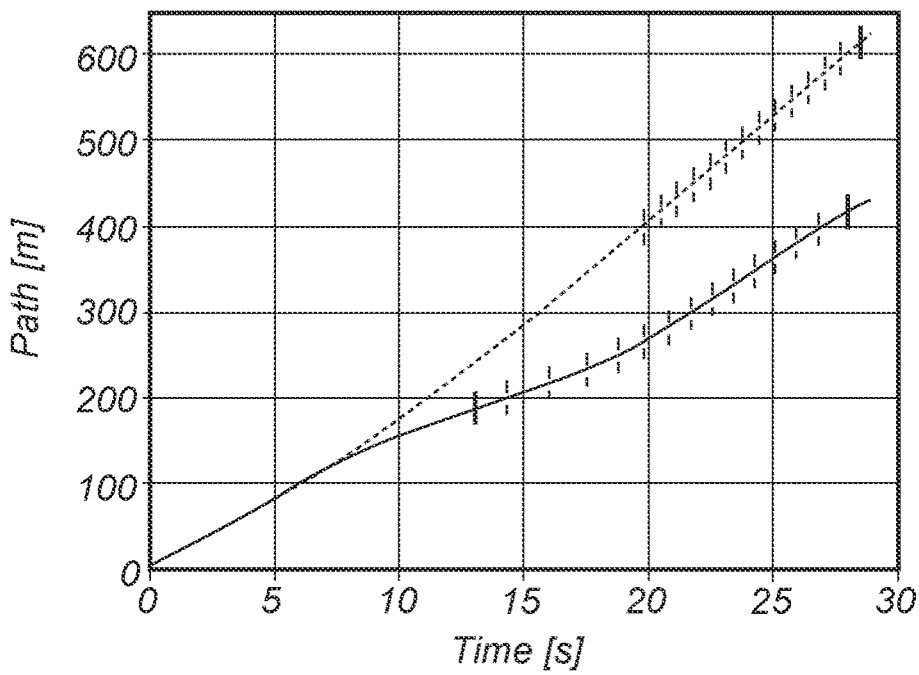
FIG. 5 shows coordinated crossing for the merge-split CZ for the red vehicle (solid curve) and blue vehicle (dashed curve).
Figure 6:
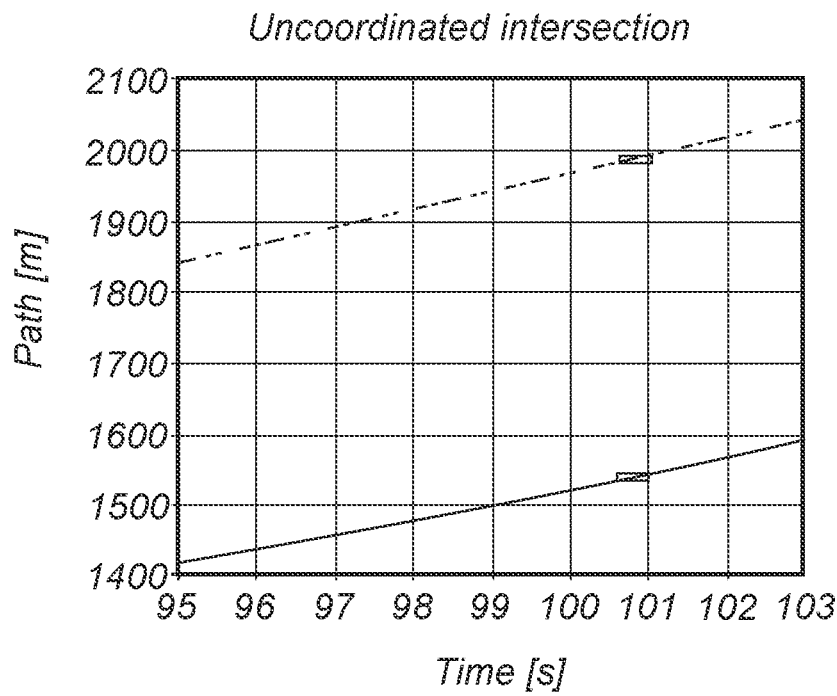
FIG. 6 shows uncoordinated crossing of an intersection CZ for the red vehicle (solid curve) and green vehicle (dash-dotted curve).
Figure 7:
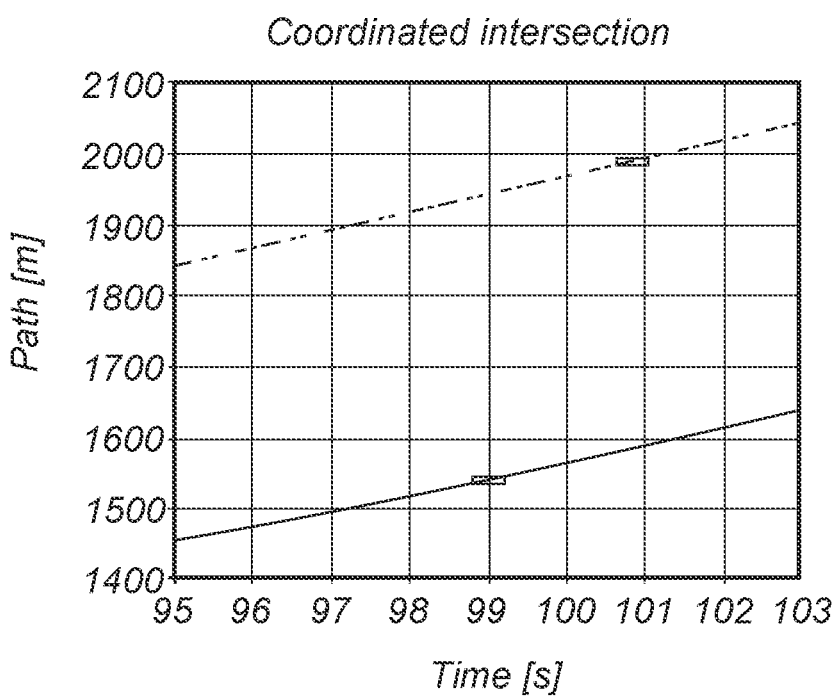
FIG. 7 shows coordinated crossing of an intersection CZ for the red vehicle (solid curve) and green vehicle (dash-dotted curve).

FIG. 4, in which path coordinate is plotted as a function of time, shows uncoordinated crossing for the merge-split CZ for the red vehicle (solid curve) and blue vehicle (dashed curve) introduced in FIG. 3. Similarly, FIG. 5 shows coordinated crossing for the merge-split CZ for the red vehicle (solid curve) and blue vehicle (dashed curve). FIG. 6 shows uncoordinated crossing of an intersection CZ for the red vehicle (solid curve) and green vehicle (dash-dotted curve). FIG. 7 shows coordinated crossing of an intersection CZ for the red vehicle (solid curve) and green vehicle (dash-dotted curve).

Figure 9:
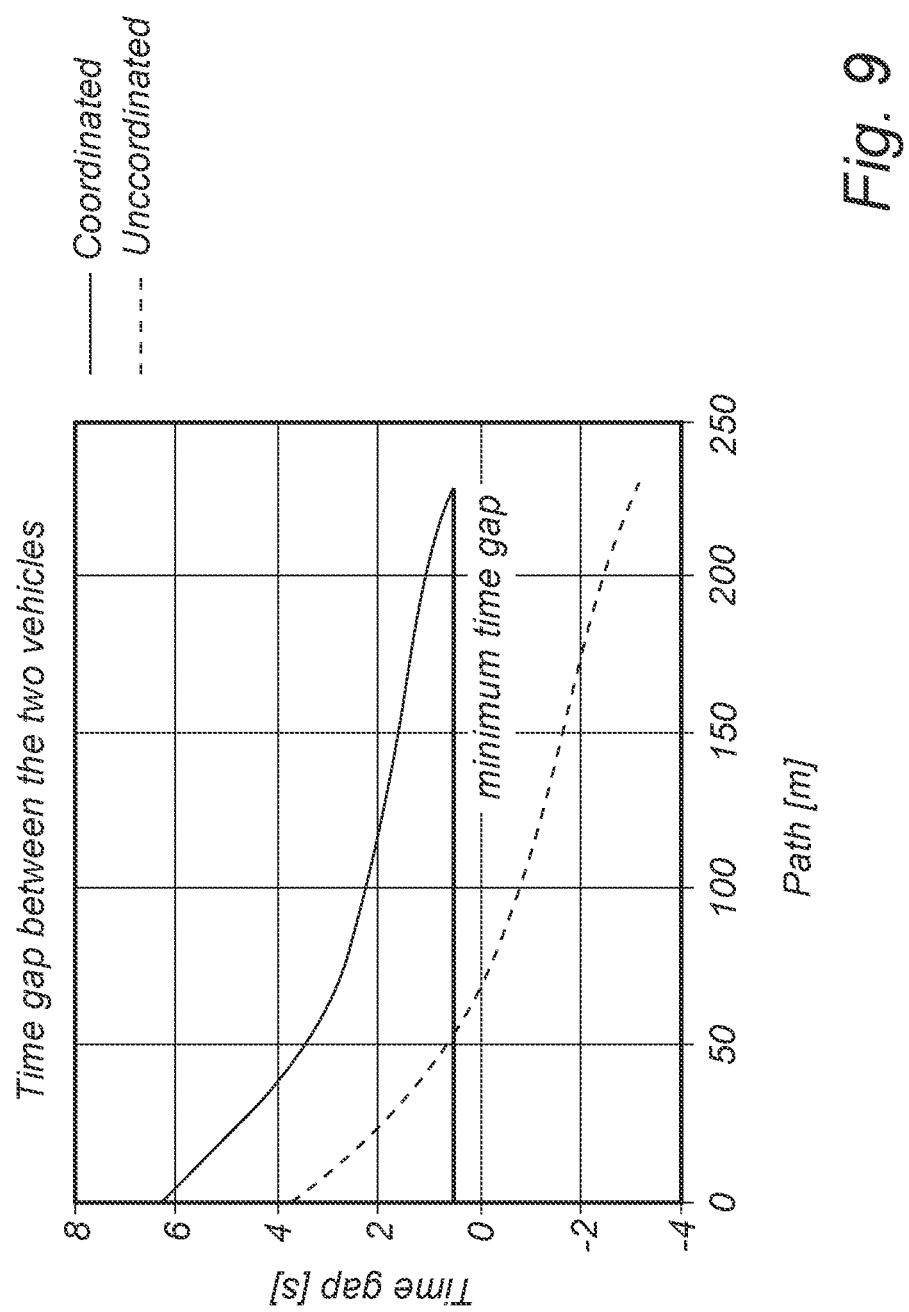
FIG. 9 shows the time gap between the red and blue vehicles in the merge-split CZ for the coordinate and uncoordinated cases.
Figure 11:
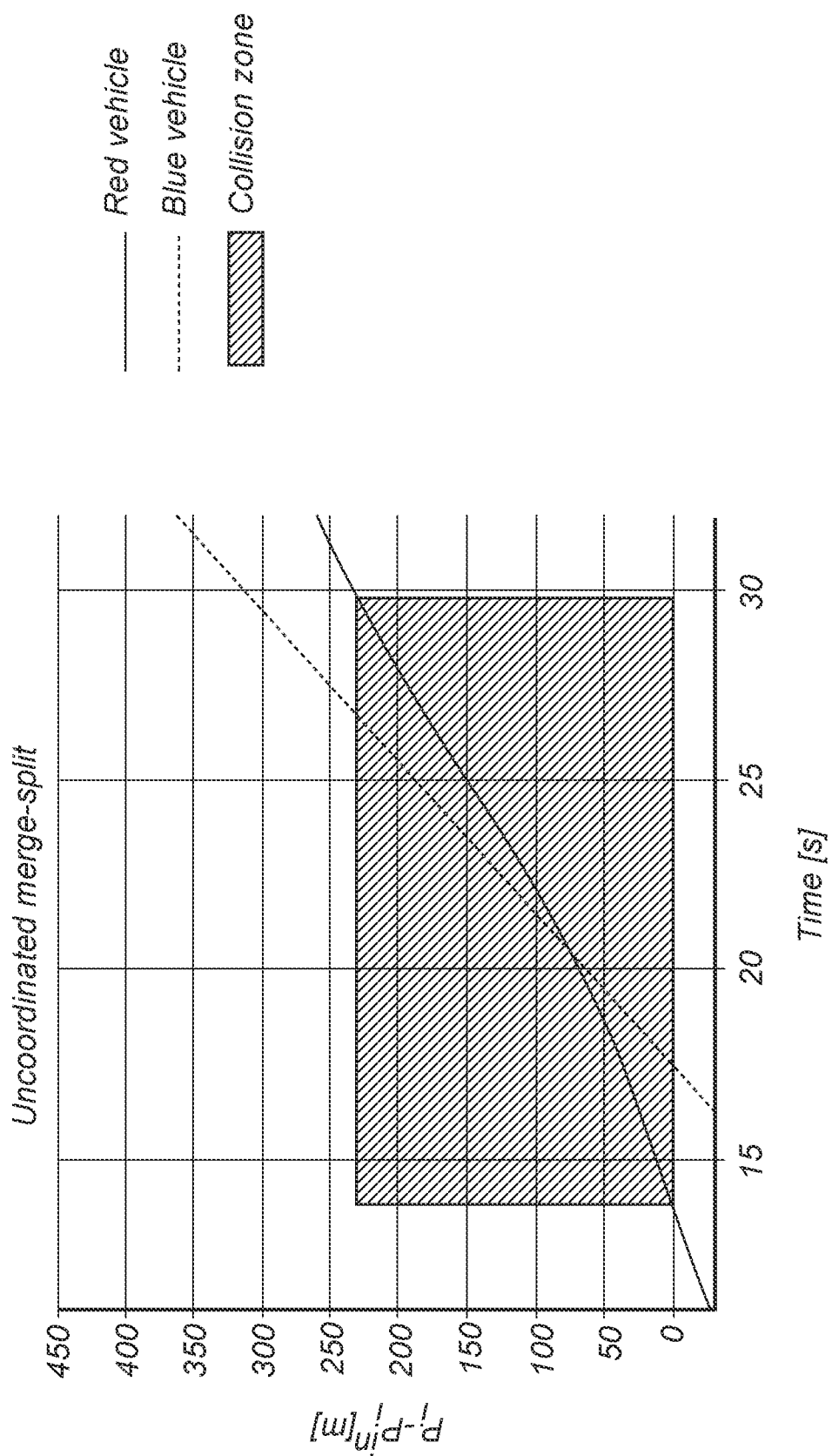
FIG. 11 shows uncoordinated crossing for the merge-split CZ for the red and blue vehicle. The grey box is the occupancy time in the zone for the red vehicle. While it is allowed for the blue vehicle to enter the CZ whilst the red vehicle is in it, an intersection between the vehicles translates to a collision between the vehicles
Figure 12:
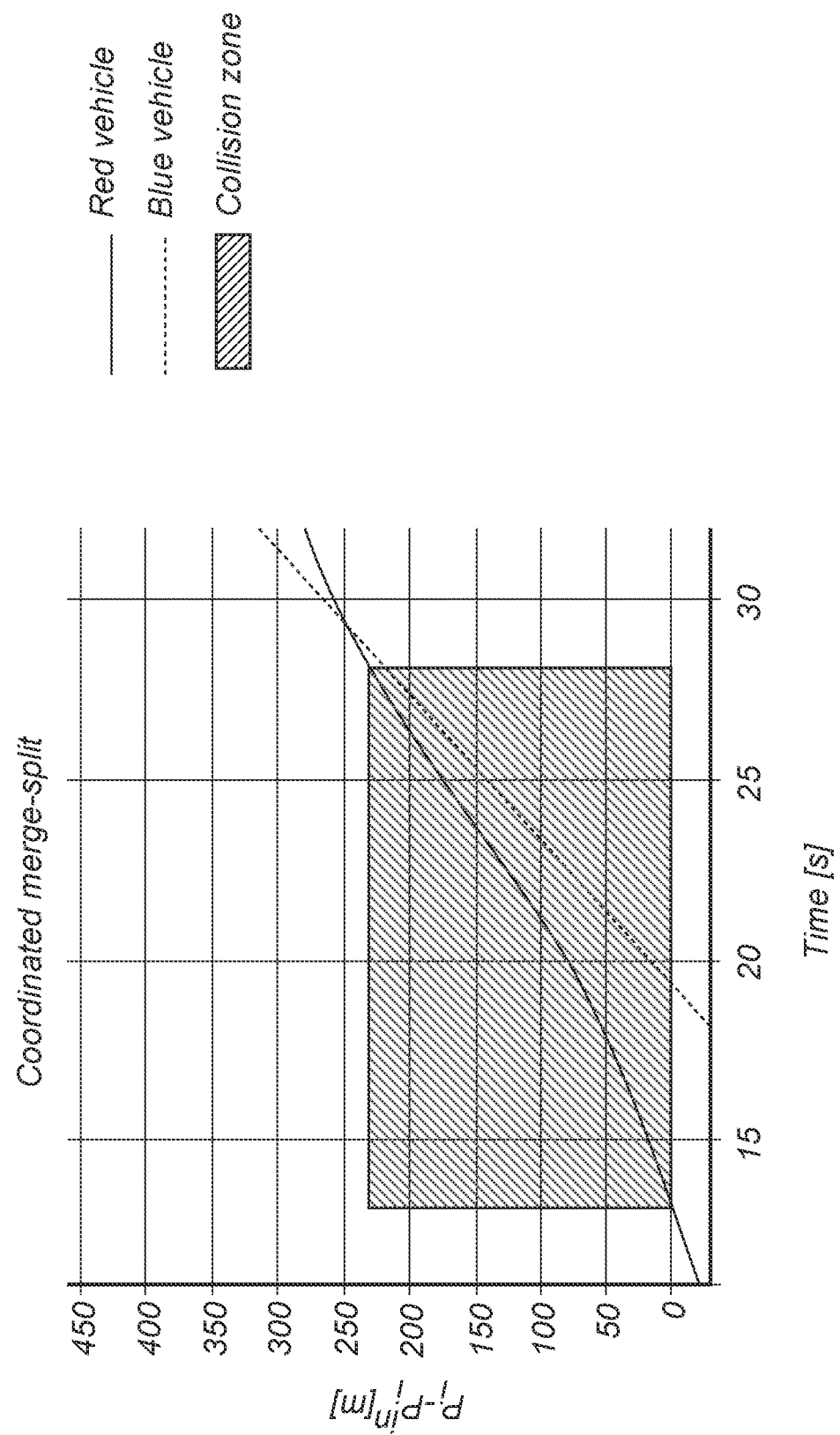
FIG. 12 shows coordinated crossing for the merge-split CZ for the red and blue vehicle. The grey box is the occupancy time in the zone for the red vehicle. The blue vehicle enters the CZ whilst the red vehicle is in and keeps the desired time gap.

FIGS. 11 and 12 illustrate the uncoordinated and coordinated crossing of the merge-split CZs, respectively. In the figures, the path trajectories of the involved vehicles are depicted. The path trajectories have an offset of their entry position to the merge-split CZ, meaning that, for both vehicles, position of zero indicates the entry position to the CZ. The grey rectangle depicts the CZ, with entry and exit times for the red vehicle, since that is the first vehicle that enters the zone in both cases. As mentioned, in this type of CZ it is desired to have multiple vehicles inside the zone whilst keeping a minimum gap between them. This means that while it is allowed for both trajectories to be inside the zone, it is not allowed for the trajectories to intersect whilst in the zone. In the uncoordinated case, it can be noticed that the blue vehicle enters the CZ later than the red vehicle, however, intersects the red vehicle and exits the zone first. The interpretation of this behavior is that inside the CZ the blue vehicle "overruns" the red vehicle, meaning that a collision occurs. In the coordinated case, the vehicles are capable of being inside the CZ at the same time and keeping at least a minimum designated gap between each other. Note that an intersection of the trajectories outside the CZ is not relevant as they are no longer on a shared road. By allowing the vehicles to be both in the CZ, and not blocking the whole zone for one vehicle, the throughput is increased meaning that the vehicles could get to their end destinations sooner. This could translate to increased efficiency of the site. To supplement the figures, FIG. 9 depicts the time gap between the vehicles while they are in a merge-split CZ. In the figure, the moment where the blue vehicle "overruns" the red vehicle in the uncoordinated case can be noticed, as well as the fact, that the desired minimum gap is kept for the coordinated case.

Figure 10:
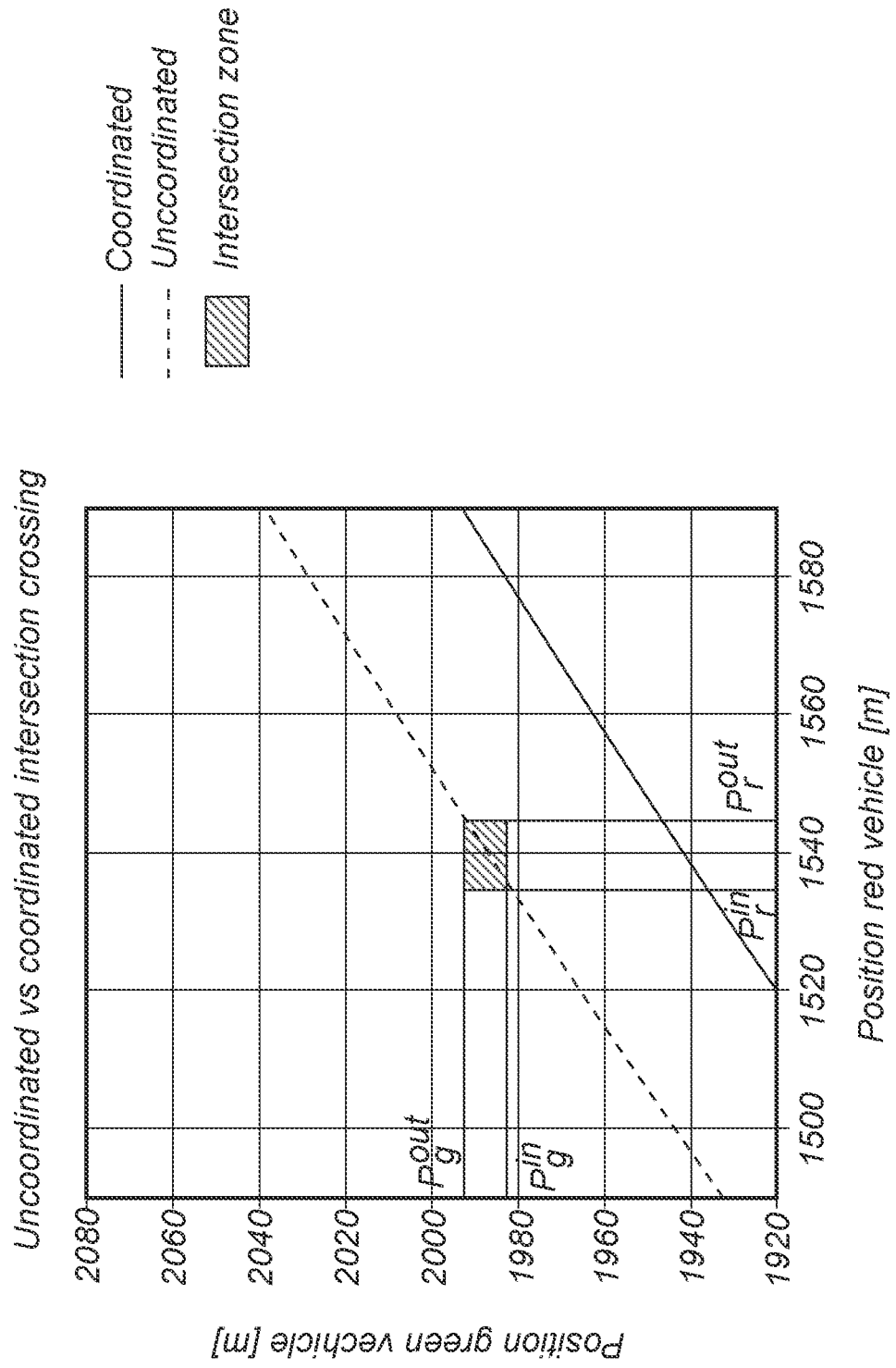
FIG. 10 shows uncoordinated and coordinated crossing of the intersection zone. An intersection of the depicted trajectory with the intersection zone is equivalent to both vehicles being in the CZ at the same time.
Figure 18:
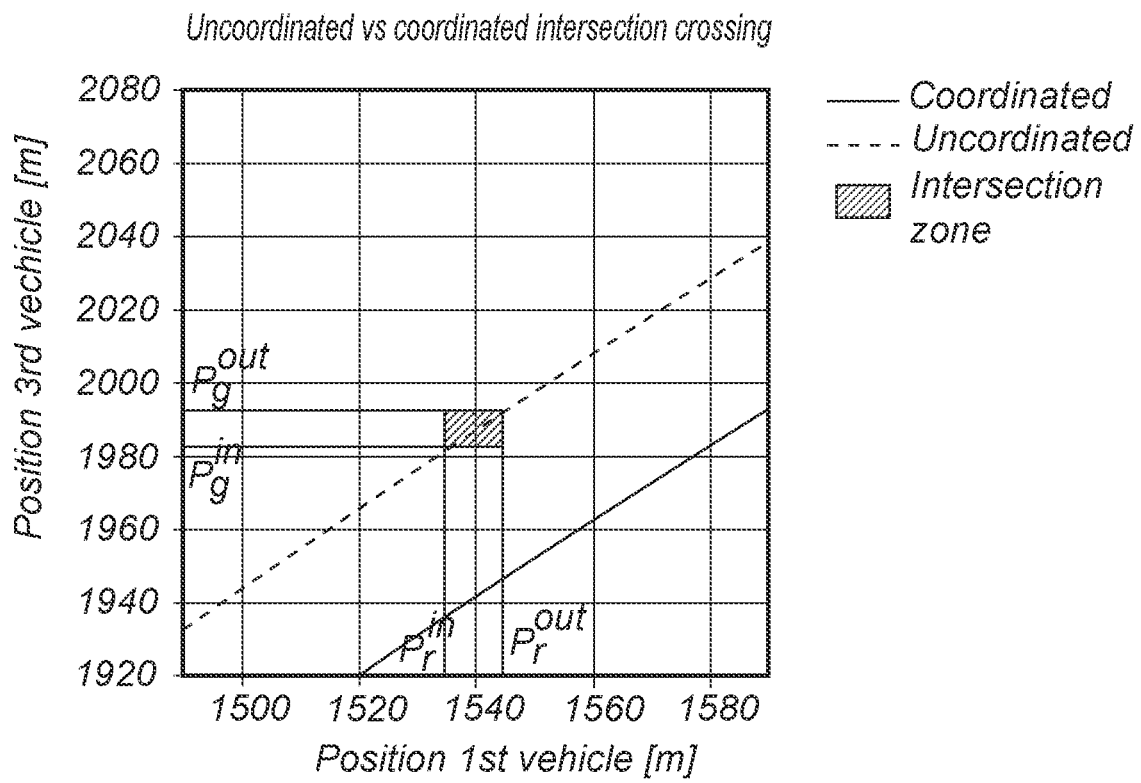
FIG. 18 shows, for the $1^{st}$ and $3^{rd}$ vehicles, uncoordinated and coordinated crossing of the intersection zone. An intersection of the depicted trajectory with the intersection zone is equivalent to both vehicles being in the CZ at the same time.

In the scenarios where two (or more) vehicles intersect, it is desired to only have one vehicle in the zone. The reasoning for this decision is that the CZ in this case occupies a relatively small patch of road and blocking off the whole zone for one vehicle will not result in major loss of throughput efficiency. FIG. 10 (First Approach), just like FIG. 18 (Second Approach), depicts the uncoordinated and coordinated vehicle trajectories along with the intersection zone. For this dependency, a collision is defined if the trajectory intersects the intersection zone, which is equivalent to the two vehicles being in the zone at the same time. It is noticeable that in the uncoordinated case the intersection zone is intersected, whilst the coordinated vehicles satisfy the collision constraints as they successfully avoid being in the CZ at the same time.

Figure 19:
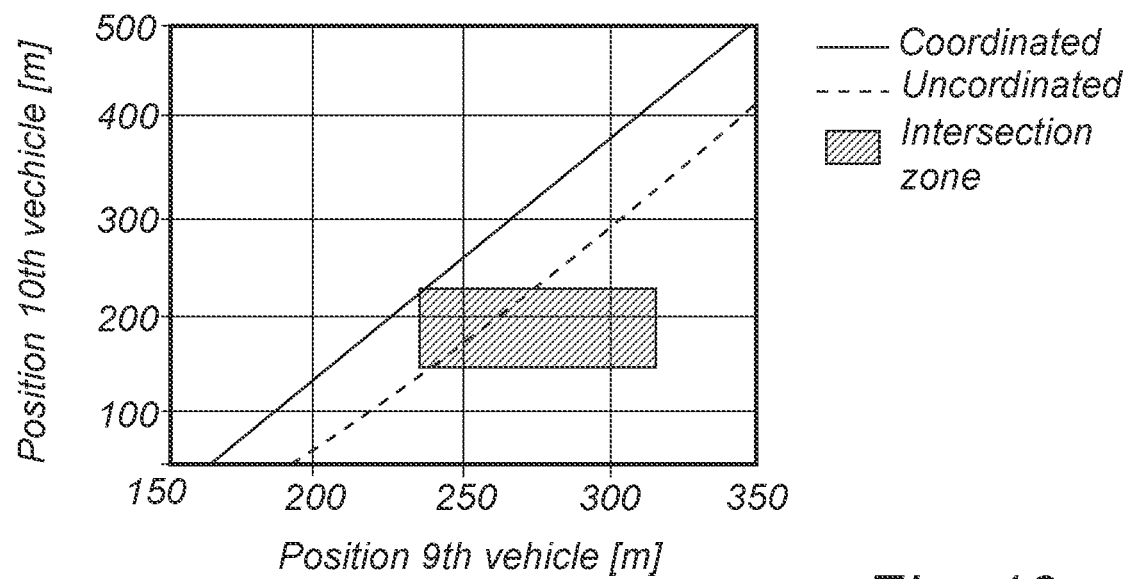
FIG. 19 shows, for the $9^{th}$ and $10^{th}$ vehicles, uncoordinated and coordinated crossing of a narrow road collision zone. An intersection of the depicted trajectory with the CZ is equivalent to both vehicles being in the CZ at the same time.

For the narrow road collision zones, the collision avoidance is defined in the same way as in the intersection zone since the road conditions allow for only one vehicle to occupy the zone at a time. In FIG. 19 (Second Approach), the uncoordinated vehicle trajectory intersects the collision zone which, as in the intersection zone scenario, results in both vehicles being inside the zone at the same time and is not desired. The coordinated case manages to avoid concurrent occupancy of the zone.

Figure 8:
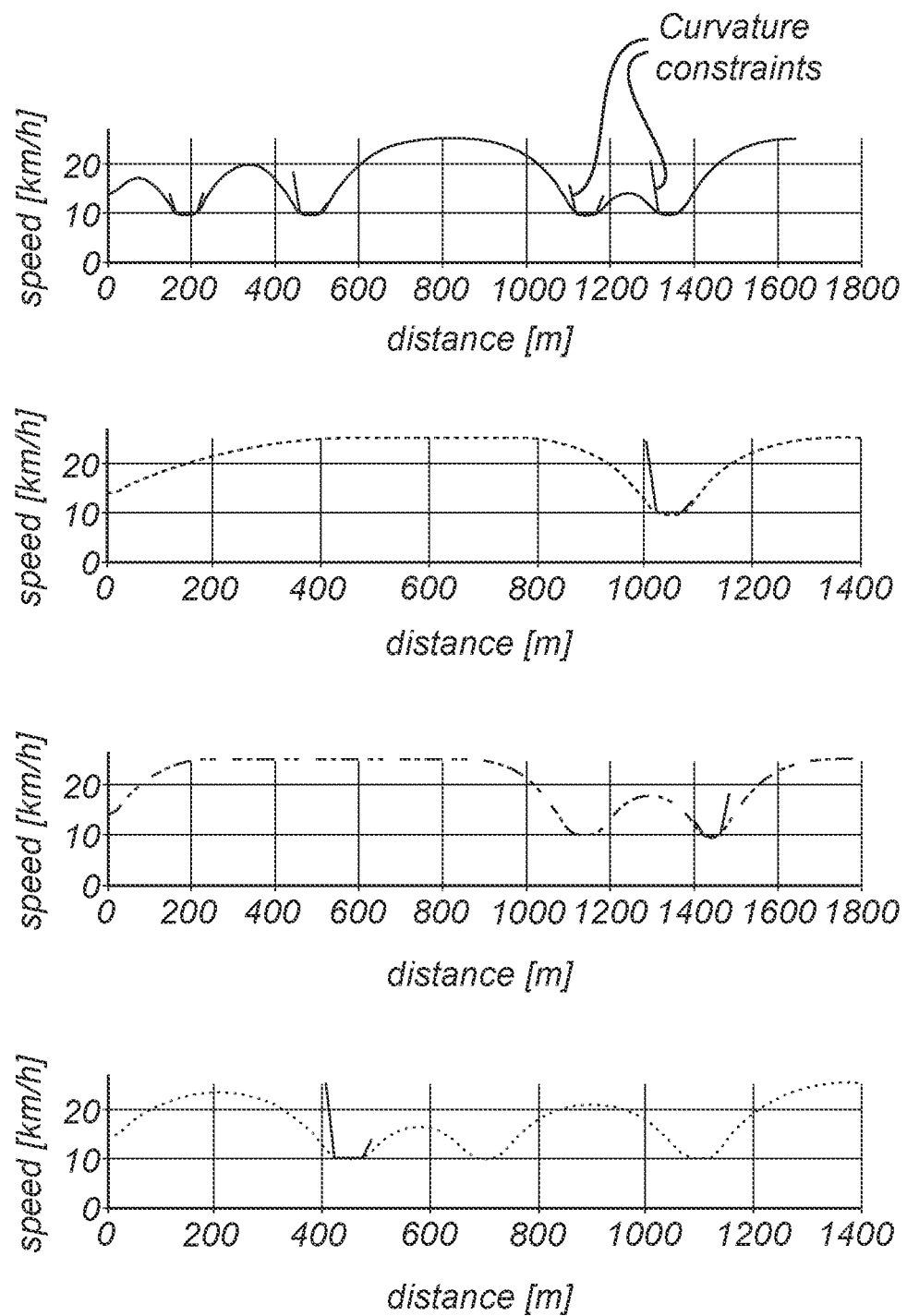
FIG. 8 shows speed profiles for the coordinated vehicles (from top to bottom: red, blue, green, black).

FIG. 8 (First Approach) depicts the vehicles' speed profiles throughout the site. As the objective function is to minimize the change of acceleration and jerk, it is noticeable that the speed profiles are smooth throughout the whole site and would not be challenging to follow in an application case. In the speed plots, the solid black lines represent the curvature constraints. It is worth noting that in the uncoordinated case for the whole site, two more collisions occur: one in the other merge-split CZ between the blue and green vehicle and another in the intersection CZ of the blue and black vehicle. When the vehicles are coordinated, these collisions are avoided. For sake of brevity, these results will not be depicted here, as the critical behavior is similar to the above-mentioned collision zones.

Figure 17:
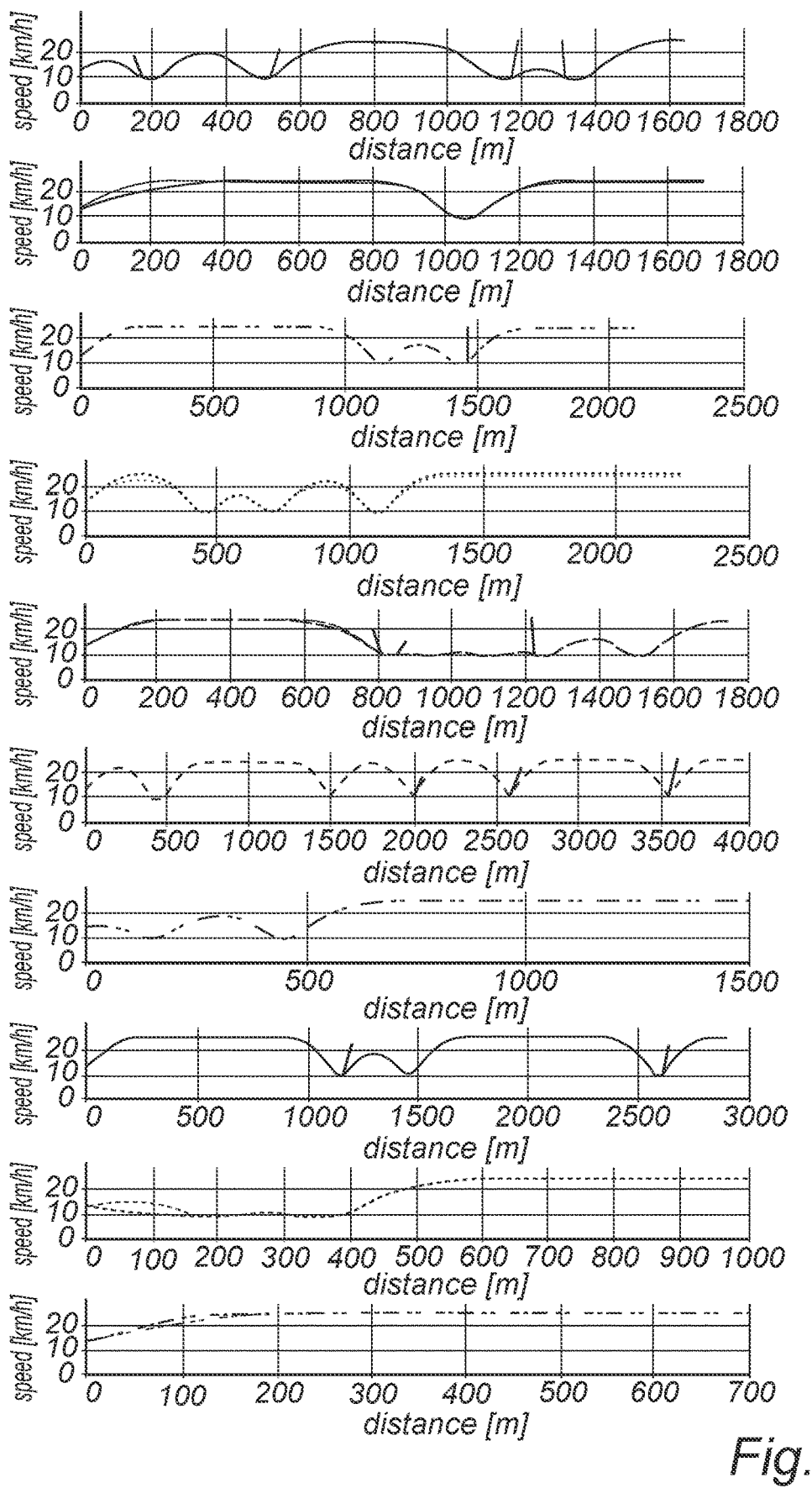
FIG. 17 shows speed profiles for the coordinated vehicles (thicker line) and uncoordinated vehicles (thinner line, occasionally overlapping).

FIG. 17 (Second Approach) depicts the vehicles' speed profiles throughout the site for the uncoordinated and coordinated case. As the algorithm is aware of all CZs the vehicles encounter, it is able with small changes of the speed profile to avoid collisions that can happen further away. With the objective function aiming to minimize the acceleration and jerk, it is noticeable that the speed profiles are smooth throughout the whole site and that they would not be challenging to follow in an application case. In the speed plots, the solid black lines touching the speed curves from above represent the curvature constraints. Under the Second Approach too, more collisions occur in the uncoordinated case for the complete site, but when the vehicles are coordinated these collisions are avoided.

The simulation scenario is implemented in MATLAB on a 2.90 GHz Intel Xeon computer with 32 GB of RAM. Under the First Approach, the total computational time for solving the example is 40.6313 seconds. The main computational load comes from the Casadi toolkit and setup. To be precise, the total time all solvers take is 1.815 seconds, of which the MIQP requires 0.08 seconds and the main Optimal Control Problem (OCP) 0.709 seconds and the remainder is the required time to solve the individual vehicle problem. The computational effort besides the solver time is the time Casadi takes to set up the environment. The total solver time is, however, still fairly high especially for real-time vehicle application and needs to be further improved. Under the Second Approach, the total time all solvers take is 1.973 seconds, of which the MIQP requires 0.140 seconds and the main Optimal Control Problem (OCP) 1.833 seconds and the remainder is the required time to solve the individual vehicle problem.

Conclusions and Future Theoretical Work

The present disclosure has presented two optimal-control based approaches for coordination of automated vehicles for sites where multiple collision zones of different types could occur. The approaches optimize the trajectories of the vehicles for their whole path length, taking all collision zones into account. To compute the crossing order in the collision zones, both approaches rely on an MIQP-based heuristic. Simulation results demonstrate the capability to coordinate the vehicles without collisions.

Implementations and Performance

Figure 13:
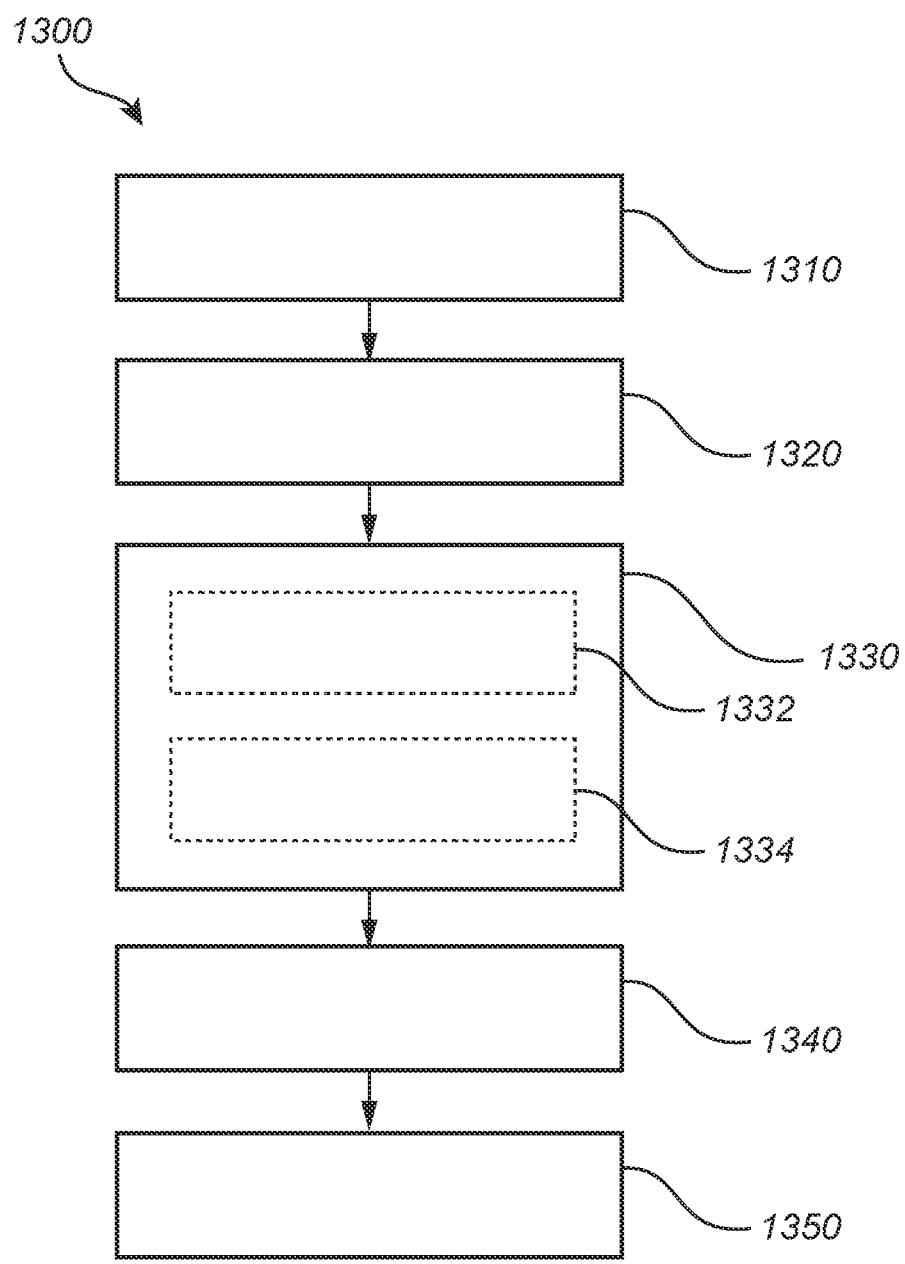
FIG. 13 is a flowchart of a method for planning routs of a plurality of vehicles, according to an embodiment of the invention.

FIG. 13 is a flowchart of a method 1300 for controlling a plurality of vehicles 1460 (see FIG. 14) operating in a common environment 1400 which includes at least one CZ, wherein movements of an $i^{th}$ vehicle is controllable by a control signal $u_i$. The execution of the method 1300 may be coordinated by a central processing resource being either fixedly installed or vehicle-carried. In the following description, by way of example, it will be assumed that the execution of the method 1300 is coordinated by processing circuitry 1452 fixedly installed in the device 1450. The device 1450 can delegate the execution of some steps of the method 1300, or parts thereof, to vehicle-carried processing resources (e.g., processing circuitry 1462) by transmitting a corresponding delegation signal D to the vehicles 1460 over the wireless interface 1451 and receiving a processing result message E in return.

Figure 15:
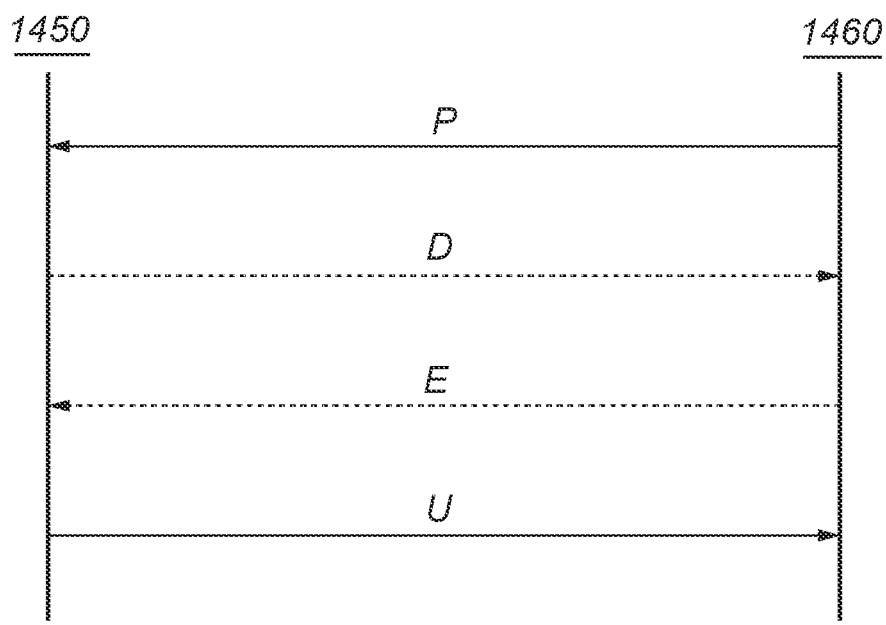
FIG. 15 is a sequence diagram showing an exchange of signals between a vehicle and a device configured to control a group of vehicles to which the vehicle belongs.

In a first step 1310 of the method 1300, current positions of all vehicles are sensed. The vehicle positions may be self-reported positions represented by a signal P (see FIG. 15) transmitted from each vehicle 1460 to the device 1450. The transmission of the signal P may be event-triggered, periodic or triggered by a request (not shown) transmitted from the device 1450 to the vehicles 1460.

In a second step 1320, a predefined objective function/is obtained. The objective function may be related to a dynamic vehicle model representing evolution with respect to path length ($p_i$), in which time ($t_i(p_i)$) and path speed ($v_i(p_i)$) are state variables.

In a third step 1330, a first optimization problem for a first objective function $V_i(T_i)$ derived from the predefined objective function is solved, to obtain a vehicle crossing order at each CZ, wherein the first optimization problem is subject to safety constraints. The safety constraints for an intersection zone 1410 or a dwelling zone 1420 may include a mutual exclusion requirement. The safety constraints for a merge-split zone 1410 may include a minimum longitudinal spacing requirement, $\Delta t$ or $\Delta t+c$.

In a fourth step 1340 of the method 1300, an OCP for the predefined objective function is solved subject to the vehicle crossing order at the CZs (obtained from the third step 1330) and subject to the safety constraints, to obtain a control signal $u_i$ for each of the vehicles. It is understood that OCP includes a dynamic vehicle model representing evolution with respect to path length $p_i$, in which time $t_i(p_i)$ and path speed $v_i(p_i)$ are state variables.

In a fifth step 1350, the control signals $u_i$ are fed to the vehicles (signal U in FIG. 15) for execution.

Under the First Approach, the CZ entry and CZ exit times may be decision variables of the first optimization problem. Further, the first objective function $V_i(T_i)$ can be a parametric local optimum of the predefined objective function J, wherein the parametric local optimum is parametrized by tentative CZ entry and CZ exit times and is independent of the safety constraints. In this case, the tentative CZ entry and CZ exit times are decision variables in the first optimization problem.

Optionally, the first objective function is approximated 1334 by a polynomial, such as a quadratic polynomial. In particular, the polynomial may be a Taylor expansion around an approximate set of CZ entry and CZ exit times; see equation 13a. The approximate set of CZ entry and CZ exit times may be obtained 1332 by a preceding step of optimizing the predefined objective function independently of the safety constraints. The optimization problem expressed in terms of the polynomial may be solved as a mixed-integer quadratic program (MIQP).

Under the Second Approach, the CZ entry and CZ exit times may be decision variables of the first optimization problem that is solved in the third step 1330. Further, the first objective function can be a quadratic approximation of the predefined objective function J.

Optionally, the first objective function is transformed 1334 by a variable substitution ($\mathcal{W} \rightarrow \mathcal{W} - \mathcal{W}^{}$) for those decision variables that represent state trajectories and control signals for the vehicle. The variable substitution corresponds to subtracting a solution conjecture ($\mathcal{W}^{}$). The solution conjecture ($\mathcal{W}^{}$) can be obtained 1332** by optimizing the predefined objective function independently of the safety constraints. The first optimization problem with the quadratic approximation may be solved as a mixed-integer quadratic program (MIQP).

In one embodiment, independently of whether the First or Second Approach is taken, a subset comprising only the obtaining 1320, solving 1330, and OCP solving 1340 steps of the method 1300 can be implemented in isolation, for the purpose of planning routes for said plurality of vehicles 1460.

The invention can be embodied as a software component that returns motion plans (e.g. speed profiles) for all vehicles from their current position to the end of their mission. The core of this software component is the generation of the motion plans, done such that no collisions occur and such that the physics of reality is considered. As seen above, the motion plans are generated by (approximately) solving an optimization problem. This optimization problem is formulated and solved based on an optimal control formulation of the site-coordination problem, using procedures from what is known as Numerical Optimal Control (NOC). NOC is a field where mathematical optimization is used to compute control commands for a dynamical system (e.g. a mechanical system such as trucks/machines) such that its evolution optimizes a performance criterion while satisfying certain constraints.

The solution to the problem yields the motion profiles for each involved vehicle, from its current position on the site to the terminal point of its transport mission, which
- are consistent with what the vehicles can do given the available knowledge of the environment and the limitations imposed by the designer (satisfy the vehicle dynamics and the vehicle constraints),
- are free of collisions and satisfies MUTEX requirements,
- maximizes performance in terms of the metric specified under the two conditions above.

As regards computational tractability, the following can be noted. In contrast to OCPs found in most other fields, the site coordination problem is combinatorial, as the order in which the vehicles on the site utilize the CZs (or MUTEX zones) must be determined to produce a solution. This means that the size of the space of possible solutions grows exponentially and that its solution therefore is computationally intractable for anything but small problems, in the general case. For illustration, consider a k-way crossing with $n_j$ vehicles approaching along a j-th lane. The total number of crossing combinations are $$\frac{(n_1 + n_2 + \ldots + n_k)!}{n_1! n_2! \ldots n_k!}$$

For a total of 8 vehicles, all approaching a four-way intersection with two from each direction, there would be 2520 distinct solutions, differing in which order the vehicles use each CZ (the crossing order). As the number of CZs and vehicles increase, the number of solutions grows rapidly.

Algorithms to handle this type of problems typically operate by systematically ruling out large parts of the possible crossing orders. This process involves solving so-called "relaxations" of the original problem. These relaxations are not combinatorial in themselves but otherwise inherits their complexity-class from the non-combinatorial part of the original problem. In the case of site-coordination problems, these are non-convex, nonlinear programs (NCNLPs), which typically are non-trivial to solve, even though so called local solutions often can be obtained. This means that, for a typical problem, many relaxations must be obtained to find a solution, and this number grows with the number of possible crossing orders in the original problem's solution-space. Hence, with the site coordination problems considered, most real problems become practically unsolvable in the context within they must be used, as the plan will be irrelevant once it is obtained.

This is one of the reasons for which the invention includes an approximating separation, performed in two steps:
(1) The construction of the "combinatorial part" of the solution through a "site-aware" heuristic, i.e., for each CZ the determination of which vehicle goes first, second, third etc., within the set of contending vehicles, taking into account the vehicle limitations, the site topology etc. approximately; and
(2) the solution of a site-wide optimal control problem where the MUTEX order is fixed. This is a standard OCP and computationally tractable optimization problem, solvable with commercial tools within the time limits admitted by the usage context, whose solution gives the optimal motion profiles for all vehicles given the current vehicle state and the heuristically obtained MUTEX order.

Here, the site-aware heuristics may include two stages:
(automatically) simplified representations of the performance objectives, physical constraints and vehicle constraints; and
a formulation of a simplified representation of the problem, using these simplifications, as a Mixed-Integer Quadratic Program (MIQPs).

Indeed, while the size of the combinatorial solution space remains the same (e.g., the number of distinct ways the 8 vehicles could cross the intersection in the example above), there are several well developed commercial tools to handle MIQPs efficiently. This allows the invention to handle significantly larger (and therefore relevant) problems within the timespans admitted by the intended usage context. The excellent scalability is one of the prominent features of the invention, allowing it to handle coordination of a desired number of vehicles in real time or near real time conditions.

The principal steps of the invention can be summarized as follows:
1. The central site planner obtains the current position and velocity of each automated vehicle on the site via wireless communication.
2. The central site planner finds a crossing order by a site-aware heuristic based on the solution of a Mixed-Integer Quadratic Program (MIQP).
   a. If the MIQP solution fails, the planner sets the crossing order of the previous cycle to be the current.
3. The central site planner solves an OCP for all vehicles where the vehicles are positioned according to the measurements obtained in step 1 and the crossing order is that produced in step 2.
   a. If the OCP solution fails, the planner sets a system fault and produce plans for all vehicles to stop immediately.
4. The central planner distributes the plan produced in step 3 to all vehicles.

Already on this general level, the invention differs from [6] notably in that the non-approximated problem, and therefore the OCP solved in step 3, is formulated with path length (distance along the path) as the independent variable, rather than time. This enables planning over the entire site (the full plan) at all moments without significant effort increase and avoids certain numerical difficulties, both issues preset in [6]. If one were to follow the lines of [6], severe penalties arise in one or both of computational resource requirements and problem formulation complexity. Notionally 'using space rather than time' as the independent variable is therefore an important step towards being able to treat site planning problems with optimization, which is not trivially realized.

Under step 2, the site-aware heuristic may operate as follows:
For each automated vehicle, compute a quadratic approximation of that vehicle's optimal performance metric as a function of the previous CZ timeslot schedule (initialized by e.g. first-come first-served), this amounts to so solving one small OCP ('greedy' problem) for each vehicle and applying tools from parametric sensitivity analysis.
Attempt to solve, using the central site planner, an MIQP constructed with the quadratic approximations from a). This gives a tentative CZ schedule.
From the CZ schedule, extract the crossing order.

The MIQP is thus constructed on a high-level abstraction of the original OCP (the problem of finding the optimal time-slot schedule) and does not deal with the positions or velocities of the vehicles directly. The resulting MIQP has small relaxations but necessitates the solution of one small OCP per vehicle.

With regard to step 4, it is noted that the plan produced by the central site planner need not be followed precisely by the vehicles on the site. If this is the case, replanning is necessary. Embodiments of the invention may therefore include feedback by periodically solving the site wide OCP based on fresh measurements of the system state. Also, the crossing order could be updated using a local search heuristic, or re-computed from scratch with either of the two heuristics (approaches).

The above-described solution can be parallelized in one or more of the following ways:
Parallel computation of each vehicle's cost and quadratic approximation. Central solution of MIQP and subsequent solution of site wide OCP.
On-board computation (i.e., using processing resources carried by the vehicle) of each vehicle's OCP, data is sent to a server which solves the MIQP site wide OCP.
On-board computation of each vehicle's OCP, data is sent to server which computes the MUTEX utilization order, server and vehicles solve the problem cooperatively, distributed computations.
On-board computation of each vehicle's OCP, data is sent vehicle to vehicle, MUTEX utilization order is negotiated vehicle to vehicle, decentralized computation.
Site-wide OCP: The solution can be parallelized by use of tailored linear-algebra which leverages the numerical structure of the problem. For instance, parts of the computations needed to solve a common problem can be delegated by the central site planner to processing resources carried by the vehicles. This may relate to computationally offloading the central site planner without necessarily ensuring that the delegation causes each vehicle to carry out 'its own' computations.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

REFERENCES

1. Bagloee, Saeed Asadi, Madjid Tavana, Mohsen Asadi, and Tracey Oliver. "Autonomous vehicles: challenges, opportunities, and future implications for transportation policies." Journal of modern transportation 24, no. 4 (2016): 284-303.
2. Khayatian, Mohammad, Mohammadreza Mehrabian, Edward Andert, Rachel Dedinsky, Sarthake Choudhary, Yingyan Lou, and Aviral Shirvastava. "A survey on intersection management of connected autonomous vehicles." ACM Transactions on Cyber-Physical Systems 4, no. 4 (2020): 1-27.
3. Hafner, Michael R., Drew Cunningham, Lorenzo Caminiti, and Domitilla Del Vecchio. "Cooperative collision avoidance at intersections: Algorithms and experiments." IEEE Transactions on Intelligent Transportation Systems 14, no. 3 (2013): 1162-1175.
4. Kuyer, Lior, Shimon Whiteson, Bram Bakker, and Nikos Vlassis. "Multiagent reinforcement learning for urban traffic control using coordination graphs." In Joint European Conference on Machine Learning and Knowledge Discovery in Databases, pp. 656-671. Springer, Berlin, Heidelberg, 2008.
5. Colombo, Alessandro, and Domitilla Del Vecchio. "Least restrictive supervisors for intersection collision avoidance: A scheduling approach." IEEE Transactions on Automatic Control 60, no. 6 (2014): 1515-1527.
6. Hult, Robert, Mario Zanon, Sebastien Gros, and Paolo Falcone. "Optimal coordination of automated vehicles at intersections: Theory and experiments." IEEE Transactions on Control Systems Technology 27, no. 6 (2018): 2510-2525.
7. Katriniok, Alexander, Peter Kleibaum, and Martina Josˇevski. "Distributed model predictive control for intersection automation using a parallelized optimization approach." IFAC-PapersOnLine 50, no. 1 (2017): 5940-5946.
8. Hult, Robert, Mario Zanon, Sebastien Gros, and Paolo Falcone. "Optimal coordination of automated vehicles at intersections with turns." In 2019 18th European Control Conference (ECC), pp. 225-230. IEEE, 2019.
9. Hult, Robert, Mario Zanon, Sébastien Gros, and Paolo Falcone. "An miqp-based heuristic for optimal coordination of vehicles at intersections." In 2018 IEEE Conference on Decision and Control (CDC), pp. 2783-2790. IEEE, 2018.
10. Letter, Clark, and Lily Elefteriadou. "Efficient control of fully automated connected vehicles at freeway merge segments." Transportation Research Part C: Emerging Technologies 80 (2017): 190-205.
11. Omidvar, Aschkan, Lily Elefteriadou, Mahmoud Pourmehrab, and Clark Letter. "Optimizing freeway merge operations under conventional and automated vehicle traffic." Journal of Transportation Engineering, Part A: Systems 146, no. 7 (2020): 04020059.
12. Bui, Khac-Hoai Nam, and Jason J. Jung. "Cooperative game-theoretic approach to traffic flow optimization for multiple intersections." Computers & Electrical Engineering 71 (2018): 1012-1024.
13. Richards, Arthur, and Jonathan How. "Mixed-integer programming for control." In Proceedings of the 2005, American Control Conference, 2005., pp. 2676-2683. IEEE, 2005.
14. Fiacco, Anthony V. Introduction to sensitivity and stability analysis in nonlinear programming. Vol. 165. Academic press, 1983.
15. Colombo, Alessandro, and Domitilla Del Vecchio. "Efficient algorithms for collision avoidance at intersections." In Proceedings of the 15th ACM international conference on Hybrid Systems: Computation and Control, pp. 145-154. 2012.
16. Kobetski, Avenir, Domenico Spensieri, and Martin Fabian. "Scheduling algorithms for optimal robot cell coordination-a comparison." In 2006 IEEE International Conference on Automation Science and Engineering, pp. 381-386. IEEE, 2006.
17. Błaz´ewicz, Jacek, Wolfgang Domschke, and Erwin Pesch. "The job shop scheduling problem: Conventional and new solution techniques." European journal of operational research 93, no. 1 (1996): 1-33.
18. Andersson, Joel A E, Joris Gillis, Greg Horn, James B. Rawlings, and Moritz Diehl. "CasADi: a software framework for nonlinear optimization and optimal control." Mathematical Programming Computation 11, no. 1 (2019): 1-36.
19. Wächter, Andreas, and Lorenz T. Biegler. "On the implementation of an interior-point filter line-search algorithm for large-scale nonlinear programming." Mathematical programming 106, no. 1 (2006): 25-57.

The invention claimed is:

1. A method of planning routes for a plurality of vehicles operating in a common environment which includes at least one conflict zone, CZ, wherein movements of each vehicle are controllable by a control signal, the method comprising:
obtaining a predefined objective function;
solving a first optimization problem for a first objective function derived from the predefined objective function, to obtain a vehicle crossing order at each CZ, wherein the first optimization problem involves two or more vehicles from said plurality of vehicles and is subject to safety constraints; and
solving an optimal-control problem, OCP, for the predefined objective function subject to the obtained vehicle crossing order at the CZs and subject to the safety constraints, to obtain a control signal for each of the vehicles,
wherein the OCP includes a dynamic vehicle model representing evolution with respect to path length, in which time and path speed are state variables, and
providing the control signal for each of the vehicles to control respective vehicles.

2. The method of claim 1, wherein CZ entry and CZ exit times are decision variables of the first optimization problem.

3. The method of claim 1, wherein the first objective function is a parametric local optimum of the predefined objective function, wherein the parametric local optimum is parametrized by tentative CZ entry and CZ exit times and is independent of the safety constraints.

4. The method of claim 3, wherein the tentative CZ entry and CZ exit times are decision variables in the first optimization problem.

5. The method of claim 1, wherein the solving of the first optimization problem includes approximating the first objective function by a Taylor expansion around an approximate set of CZ entry and CZ exit times, wherein optionally the Taylor expansion is quadratic.

6. The method of claim 5, wherein the approximate set of CZ entry and CZ exit times is obtained by optimizing the predefined objective function independently of the safety constraints.

7. The method of claim 1, wherein pairwise relative vehicle crossing orders as well as a state trajectory and control signal for each of the vehicles are decision variables of the first optimization problem.

8. The method of claim 1, wherein the first objective function is a quadratic approximation of the predefined objective function.

9. The method of claim 1, wherein the solving of the first optimization problem includes performing a variable substitution for those decision variables that represent state trajectories and control signals for the vehicles.

10. The method of claim 9, wherein the variable substitution corresponds to subtracting a solution conjecture.

11. The method of claim 10, wherein the solution conjecture is obtained by optimizing the predefined objective function independently of the safety constraints.

12. The method of claim 10, wherein the solution conjecture is obtained by forward simulation of the vehicles.

13. The method of claim 12, wherein the forward simulation of vehicles is performed using a linear-quadratic regulator, LQR.

14. The method of claim 5, wherein the optimization of the Taylor expansion and/or the first optimization problem is solved as a mixed-integer quadratic program, MIQP.

15. The method of claim 1, wherein the CZ or CZs include at least one of the following: an intersection zone, a merge-split zone, a dwelling zone, wherein the safety constraints for an intersection zone or a dwelling zone include a mutual exclusion requirement, and wherein the safety constraints for a merge-split zone include a minimum longitudinal spacing requirement.

16. The method of claim 1, wherein the common environment is a confined area with no other traffic participants than said vehicles.

17. A method of controlling a plurality of vehicles operating in a common environment which includes at least one CZ, wherein movements of each vehicle is controllable by a control signal, the method comprising:
sensing current positions of all vehicles;
performing route planning according to claim 1, subject to the sensed vehicle positions, to obtain a control signal for each of the vehicles; and
feeding the control signal to the vehicles.

18. The method of claim 17, wherein said route planning is, at least in part, delegated to processing resources carried by one of the vehicles.

19. The method of claim 17, wherein the execution of the method, including any delegation, is coordinated by a central processing resource, which is either fixedly installed or carried by one of the vehicles.

20. A non-transitory computer readable medium storing a computer program comprising instructions which, when the program is executed by a computer, cause the computer to carry out the method of claim 1.

21. A device comprising memory and processing circuitry configured to perform the method of claim 1.

* * * * *